US012685974B2

(12) United States Patent
Matsuzawa et al.

(10) Patent No.: US 12,685,974 B2
(45) Date of Patent: Jul. 21, 2026

(54) LIQUID MIXER, ELECTROLYTE ANALYSIS DEVICE, AND LIQUID MIXING METHOD

(71) Applicant: Hitachi High-Tech Corporation, Tokyo (JP)

(72) Inventors: Mitsuhiro Matsuzawa, Tokyo (JP); Mariko Miyazaki, Tokyo (JP); Yuichi Iwase, Tokyo (JP); Takushi Miyakawa, Tokyo (JP); Masafumi Miyake, Tokyo (JP); Haruyoshi Yamamoto, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 633 days.

(21) Appl. No.: 18/033,587

(22) PCT Filed: Sep. 1, 2021

(86) PCT No.: PCT/JP2021/032180

§ 371 (c)(1),
(2) Date: Apr. 25, 2023

(87) PCT Pub. No.: WO2022/102222

PCT Pub. Date: May 19, 2022

(65) Prior Publication Data

US 2023/0390716 A1 Dec. 7, 2023

(30) Foreign Application Priority Data

Nov. 12, 2020 (JP) ................................ 2020-188519

(51) Int. Cl.
*B01F 23/00* (2022.01)
*B01F 23/40* (2022.01)
(Continued)

(52) U.S. Cl.
CPC .......... *B01F 23/405* (2022.01); *B01F 23/451* (2022.01); *B01F 25/101* (2022.01)

(58) Field of Classification Search
None
See application file for complete search history.

(56) References Cited

U.S. PATENT DOCUMENTS

2011/0273955 A1* 11/2011 Matsumura ......... B01F 25/4512 366/152.1

FOREIGN PATENT DOCUMENTS

CN 209934621 U 1/2020
EP 1 762 298 A1 3/2007
(Continued)

OTHER PUBLICATIONS

International Search Report (PCT/ISA/210) issued in PCT Application No. PCT/JP2021/032180 dated Nov. 16, 2021 with English translation (four (4) pages).
(Continued)

*Primary Examiner* — Anshu Bhatia
(74) *Attorney, Agent, or Firm* — Crowell & Moring LLP

(57) ABSTRACT

Provided is a technique for efficiently mixing a plurality of liquids by using only a single liquid feeding device. This liquid mixer comprises: a first inflow flow path into which a first liquid flows; a second inflow flow path into which a second liquid flows; a liquid merging part where the first liquid and the second liquid merge; an outflow flow path which is connected to the liquid merging part and through which the first liquid and the second liquid flow out; and a single liquid feeding device. The liquid merging part has a first flow path connected to the first inflow flow path, and a second flow path connected to the second inflow flow path, the first flow path branches into at least two flow paths, and the second flow path branches into at least two flow paths.
(Continued)

One among the flow paths branched from the first flow path and one among the flow paths branched from the second flow path are connected and merged with each other. Another one of the flow paths branched from the first flow path and another one among the flow paths branched from the second flow path are connected and merged with each other on the downstream side, and are connected to the outflow flow path.

20 Claims, 24 Drawing Sheets

(51) Int. Cl.

*B01F 23/451* (2022.01)

*B01F 25/10* (2022.01)

(56) References Cited

FOREIGN PATENT DOCUMENTS

| | | | |
|---|---|---|---|
| JP | 9-236525 | A | 9/1997 |
| JP | 2000-214174 | A | 8/2000 |
| JP | 2002-45666 | A | 2/2002 |
| JP | 2004-313867 | A | 11/2004 |
| JP | 2007-61685 | A | 3/2007 |
| JP | 2007-69137 | A | 3/2007 |

OTHER PUBLICATIONS

Japanese-language Written Opinion (PCT/ISA/237) issued in PCT Application No. PCT/JP2021/032180 dated Nov. 16, 2021 (five (5) pages).

Chinese-language Office Action issued in Chinese Application No. 202180067919.0 dated Nov. 6, 2025 (8 pages).

* cited by examiner

[FIG. 1]
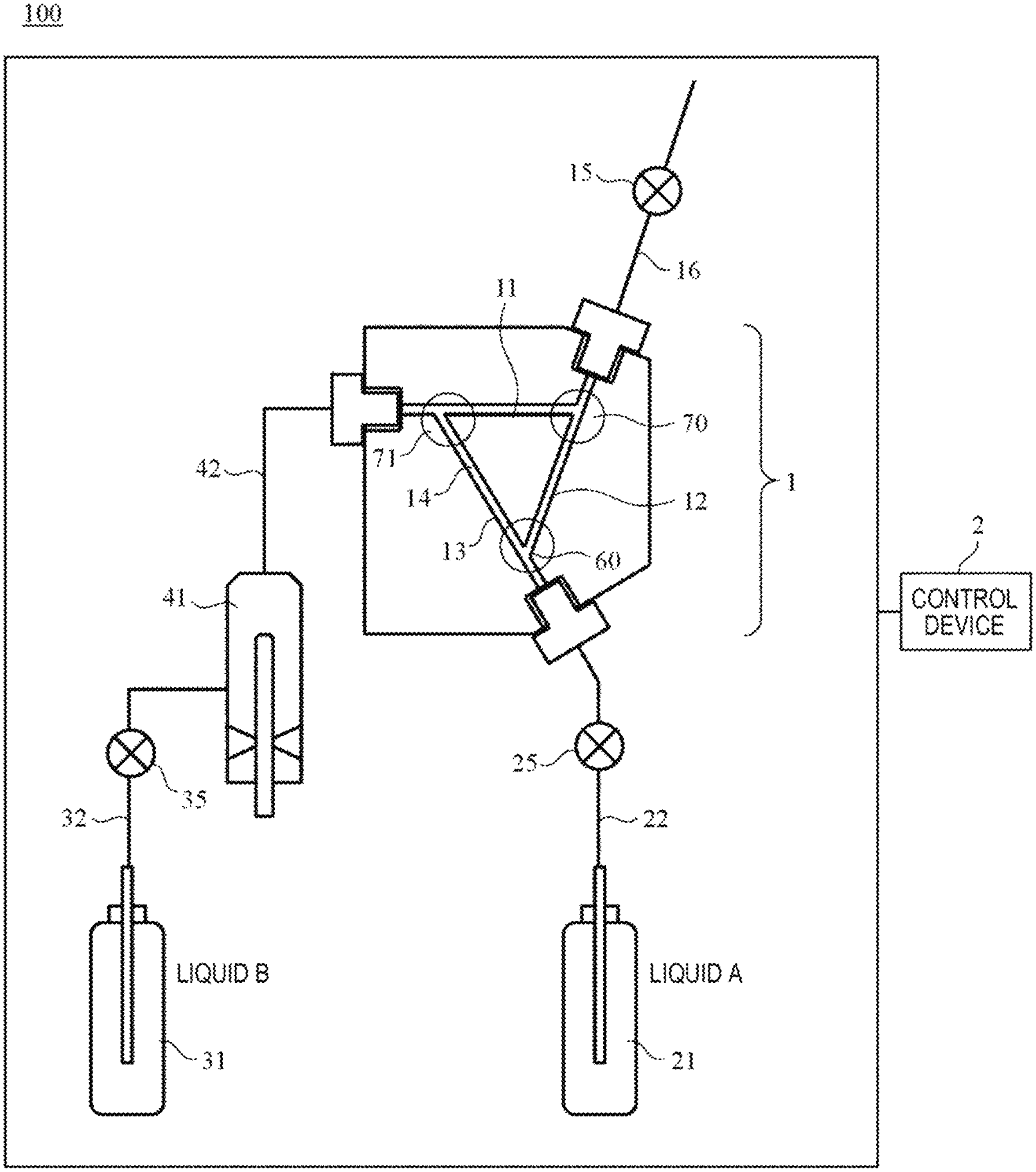

[FIG. 2]

| STEP No. | OPERATION OF LIQUID SENDING DEVICE 41 | VALVE 25 | VALVE 35 | VALVE 15 |
|---|---|---|---|---|
| S1 | INITIAL STATE | CLOSE | CLOSE | CLOSE |
| S2 | SUCTIONING OF LIQUID A (15μL) | **OPEN** | CLOSE | CLOSE |
| S3 | SUCTIONING OF LIQUID B (450μL) | CLOSE | **OPEN** | CLOSE |
| S4 | DISCHARGE (465μL) | CLOSE | CLOSE | **OPEN** |

[FIG. 4]
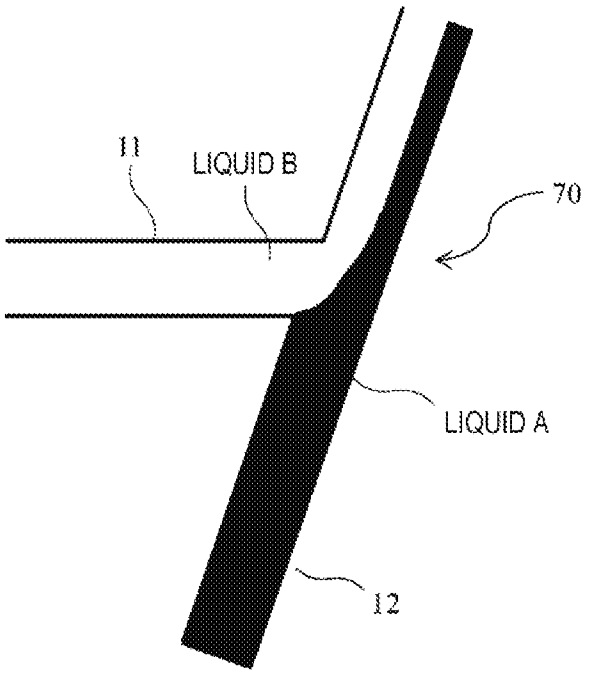
FIG. 5A
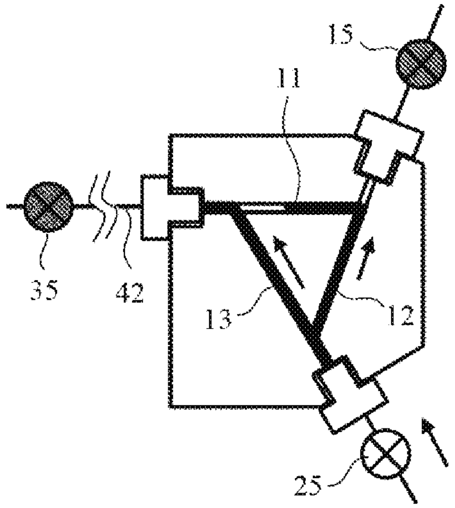
FIG. 5B
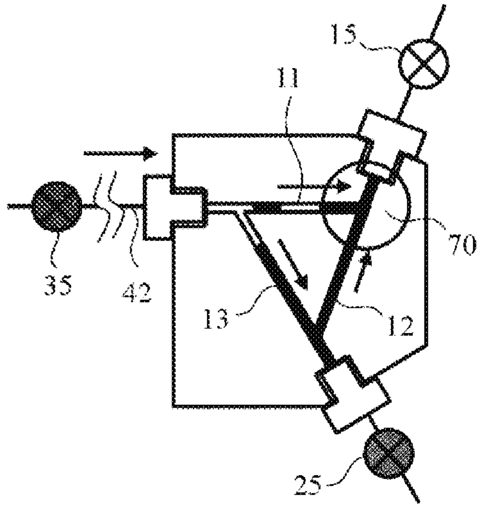

[FIG. 6]
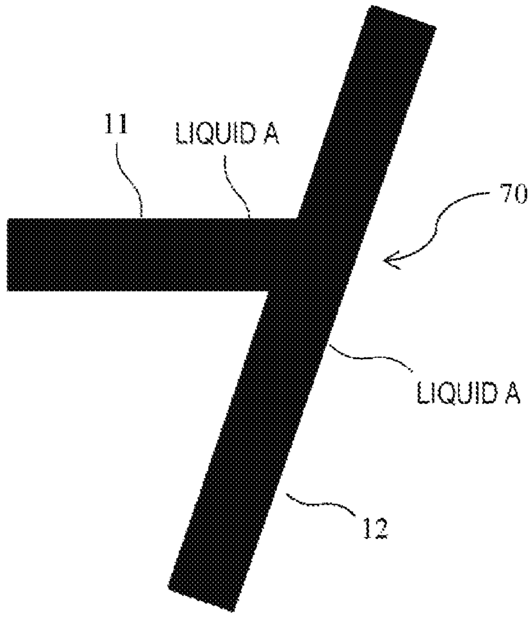
FIG. 7A
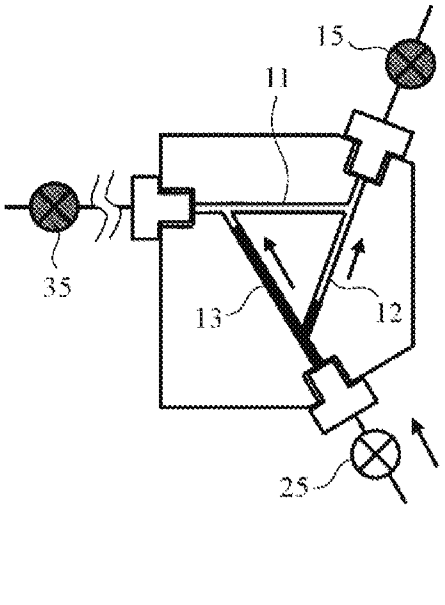
FIG. 7B
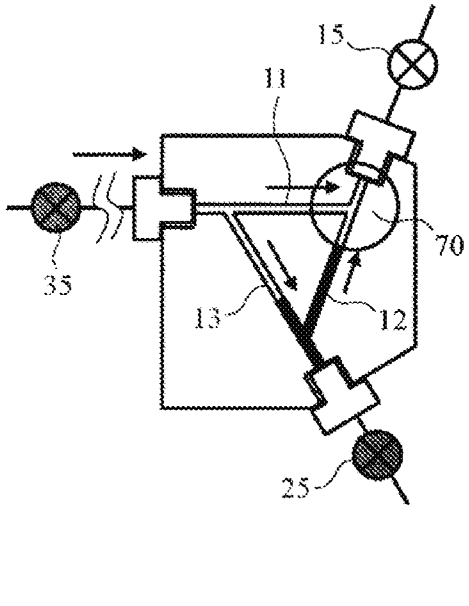

[FIG. 8]
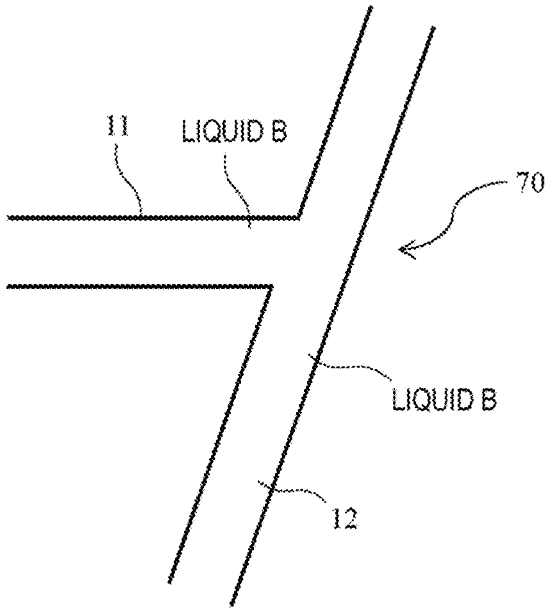

[FIG. 10]
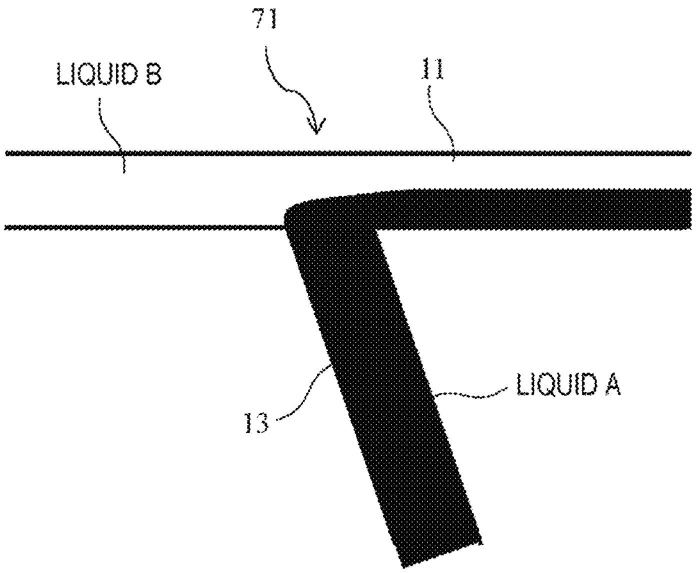
[FIG. 11]
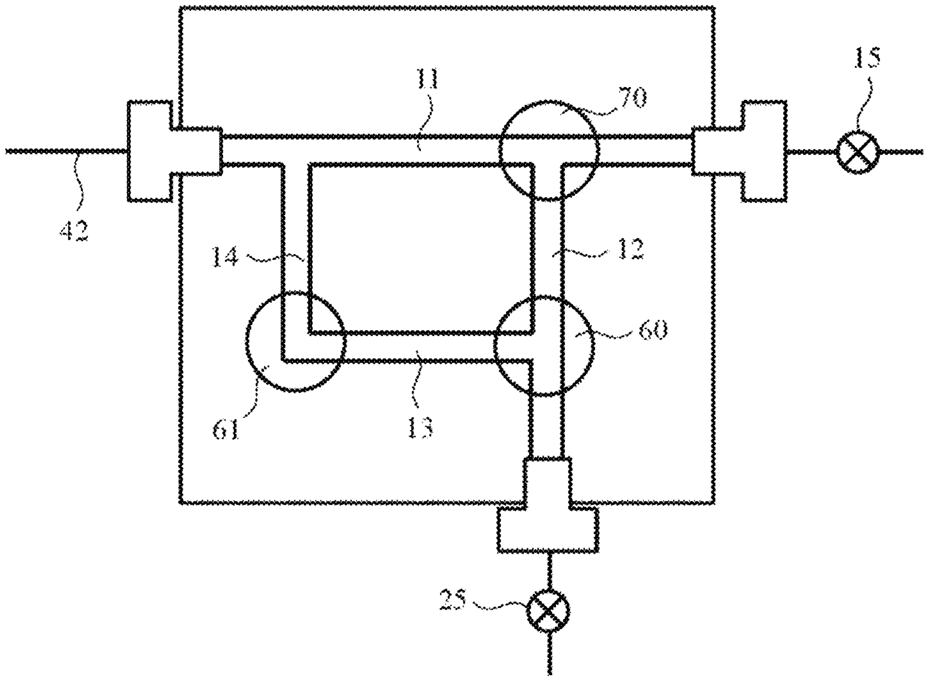

[FIG. 12]
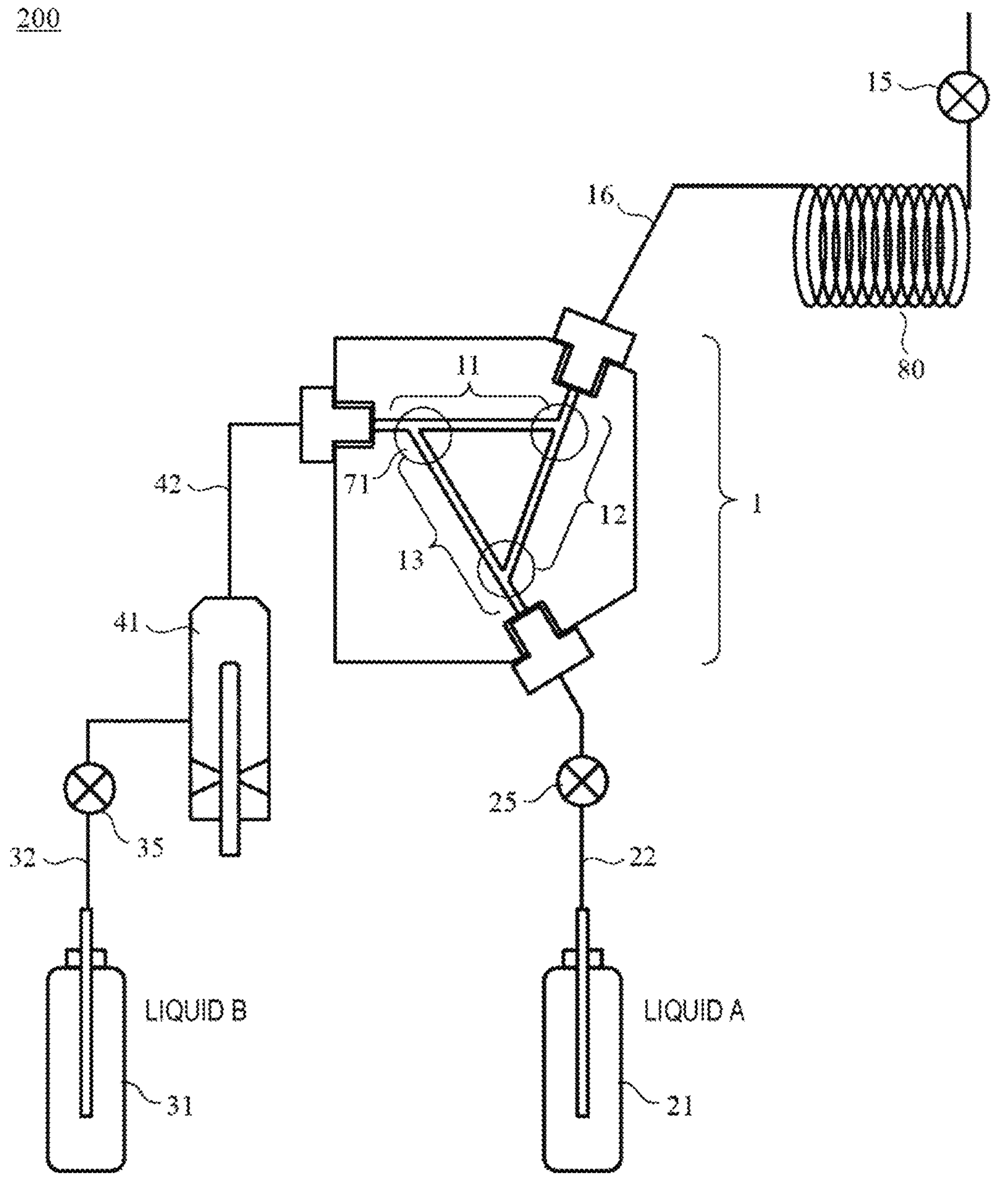

[FIG. 13]
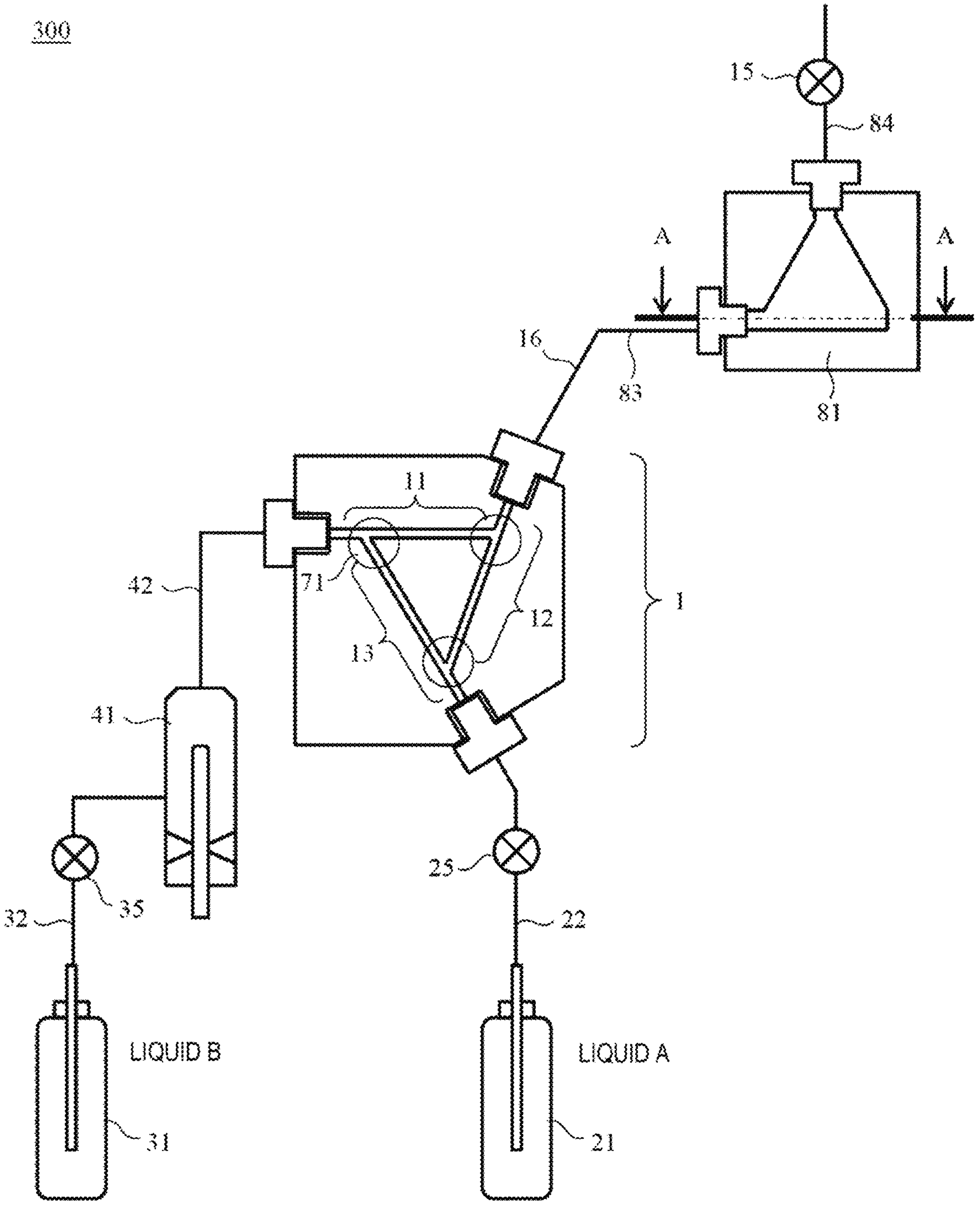

[FIG. 14]
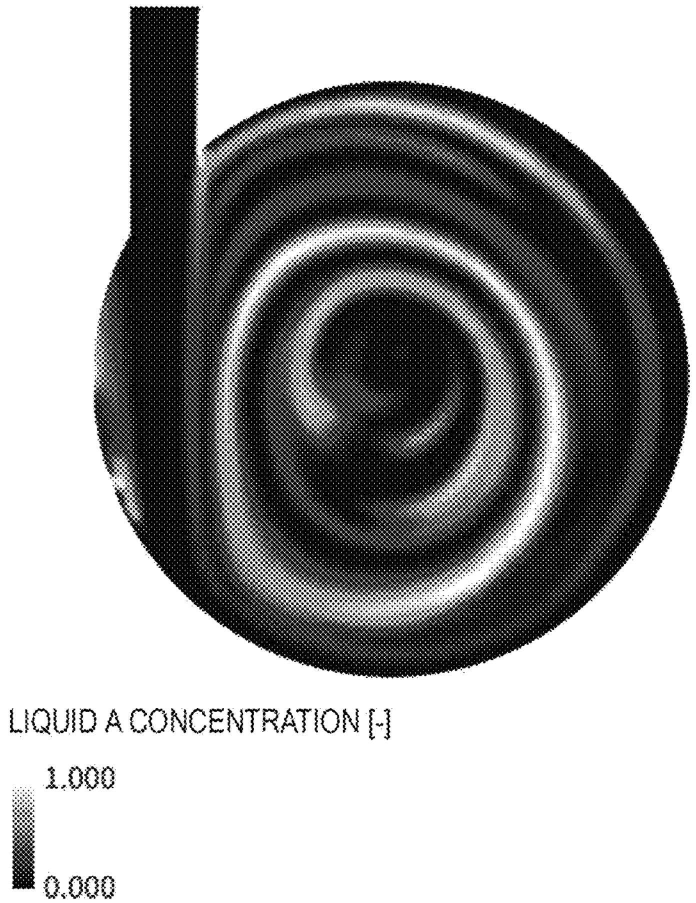

[FIG. 15]
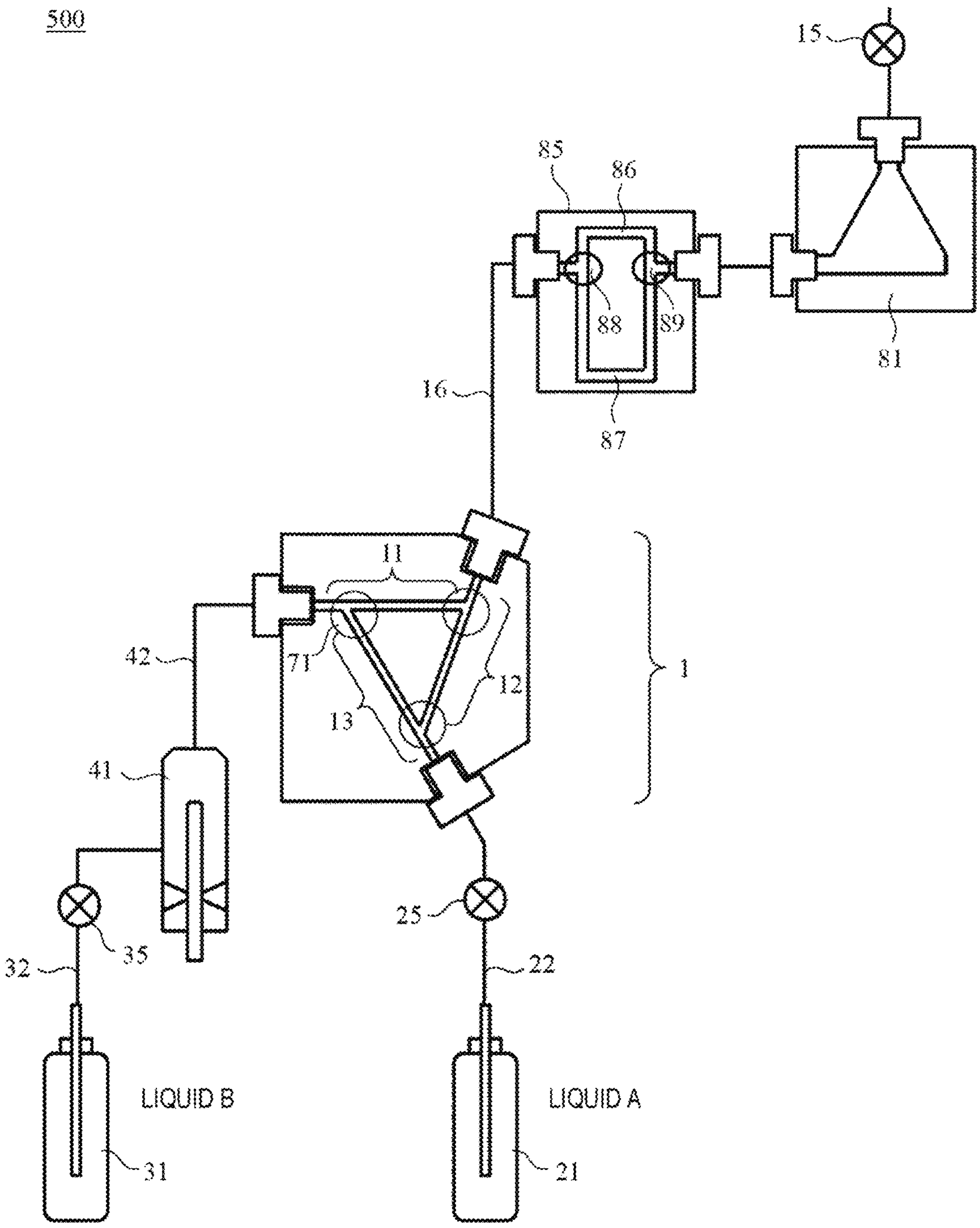

11: Φ1.1 × 10 mm
12: Φ1.2 × 22 mm
13: Φ1.2 × 24 mm
18: Φ0.9 × 9 mm
19: Φ0.5 × 3.5 mm
86: Φ0.8 × 11 mm
87: Φ1.2 × 56 mm

FIG. 17A
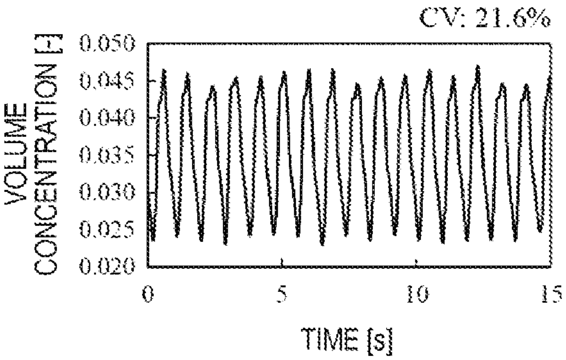
FIG. 17B
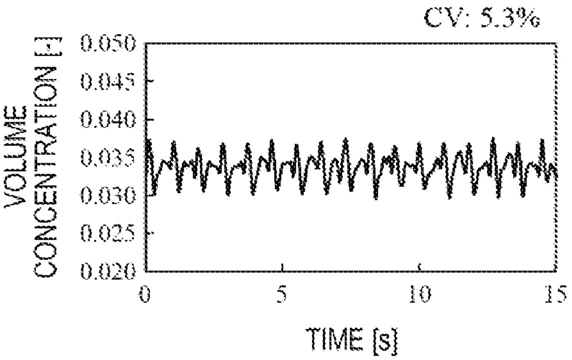
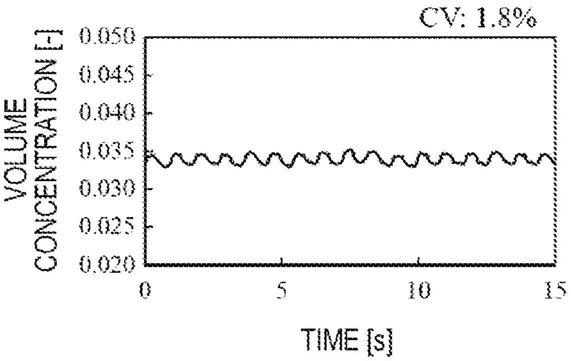
FIG. 17C
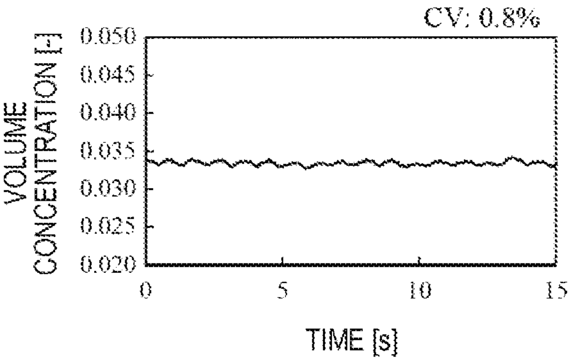
FIG. 17D

[FIG. 18]
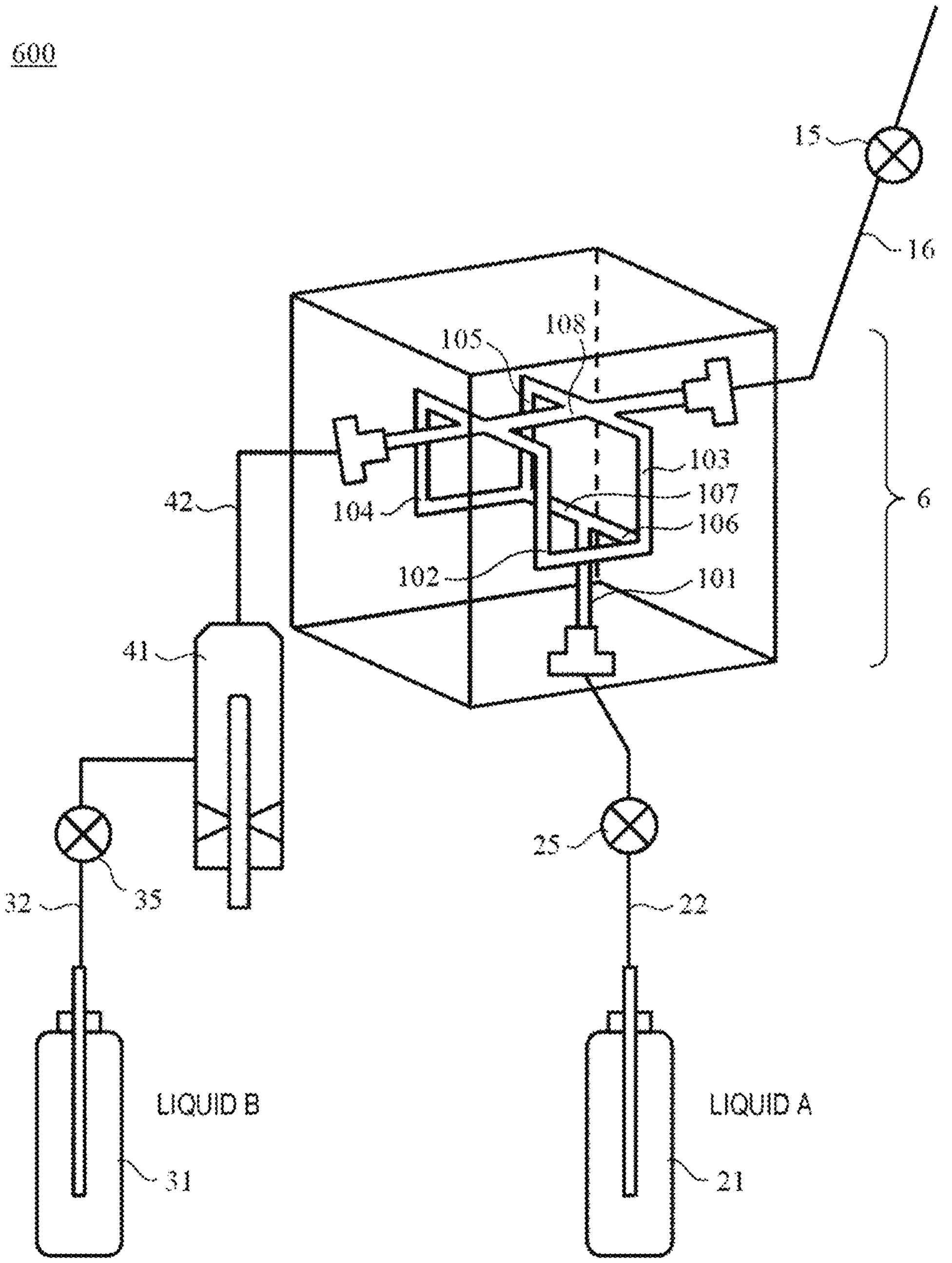

[FIG. 20]
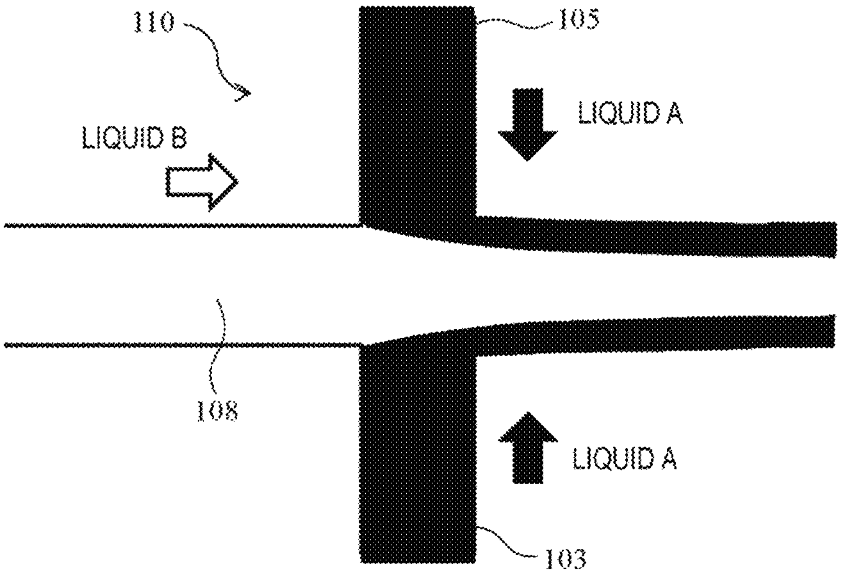

[FIG. 21]
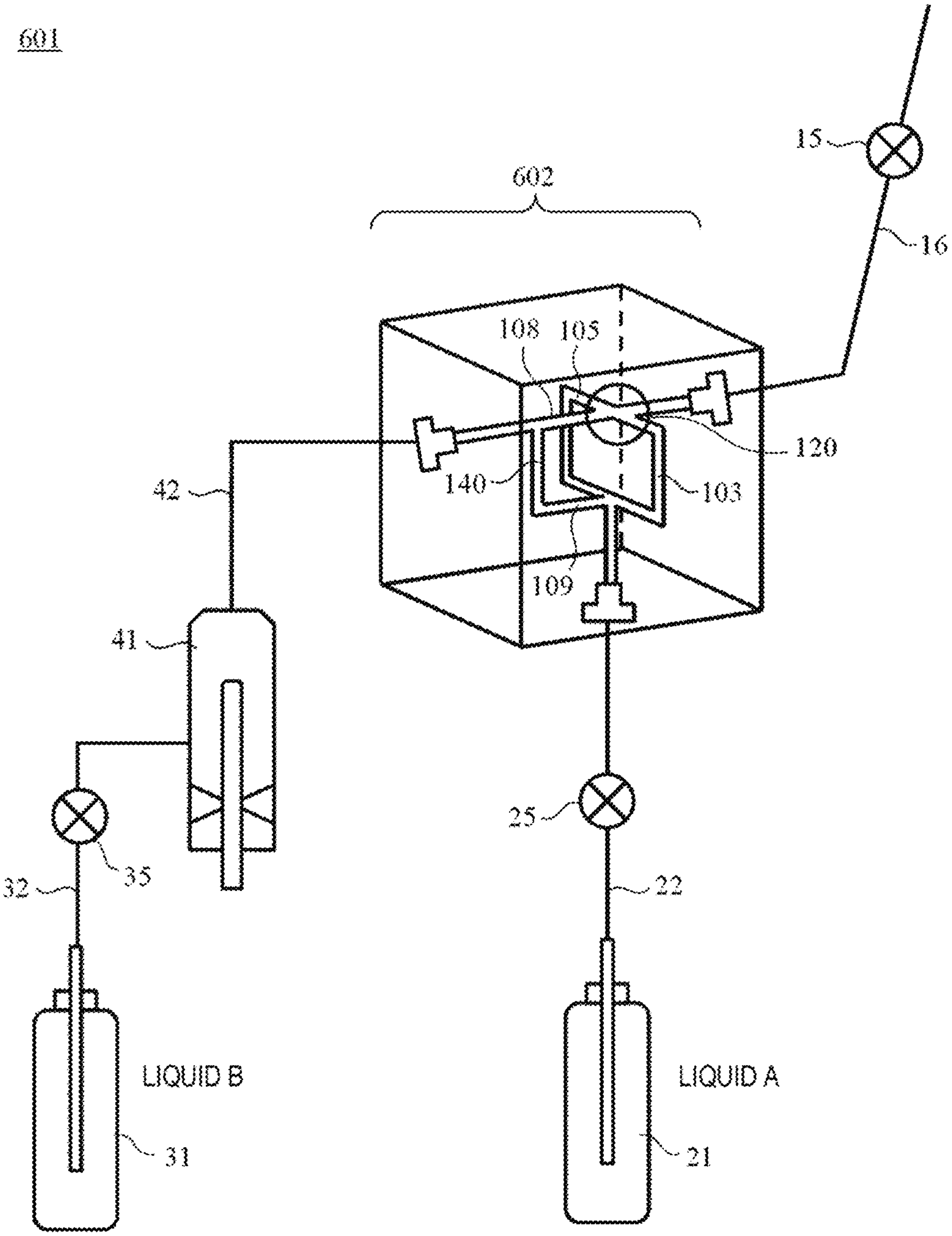

[FIG. 23]
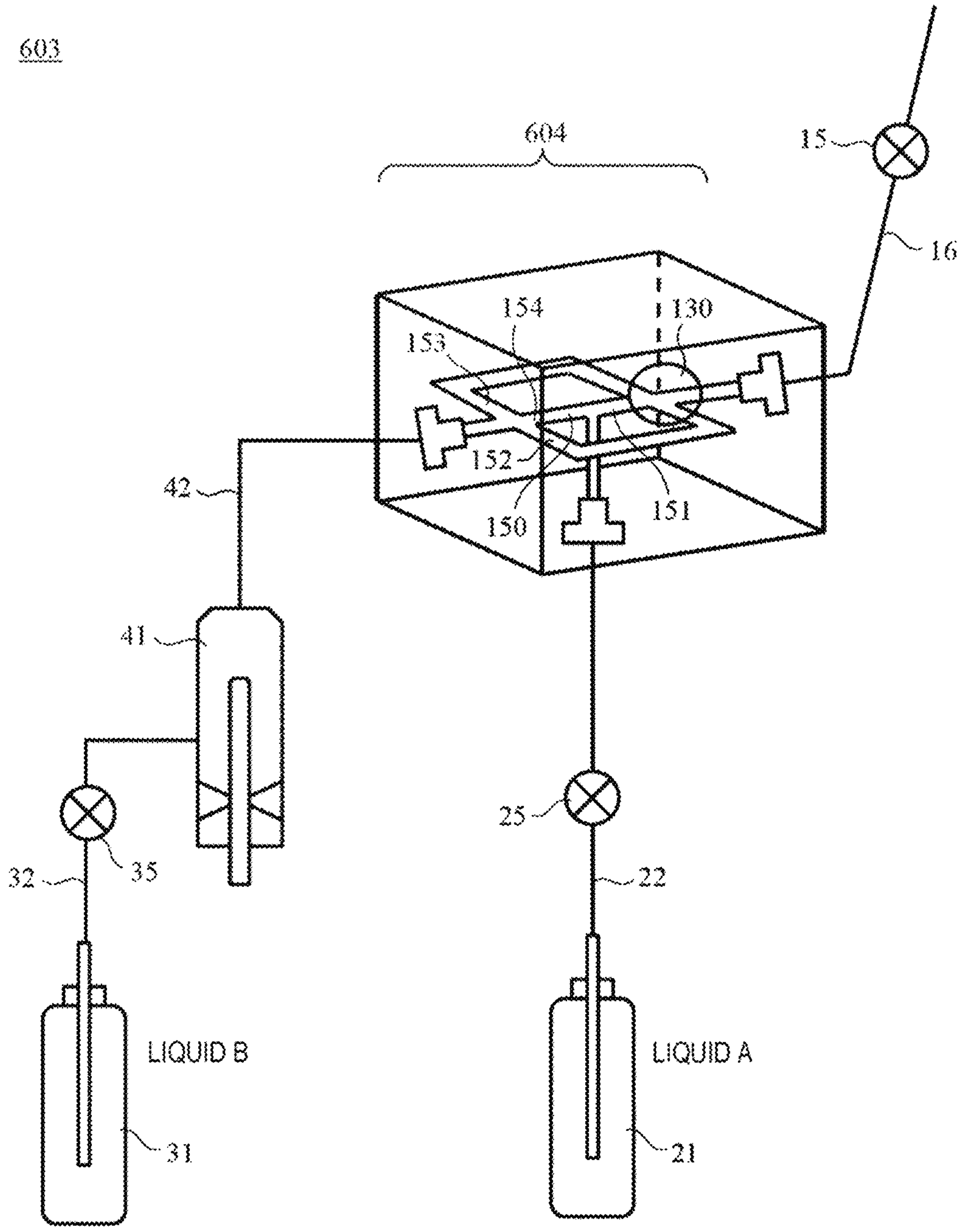

[FIG. 25]
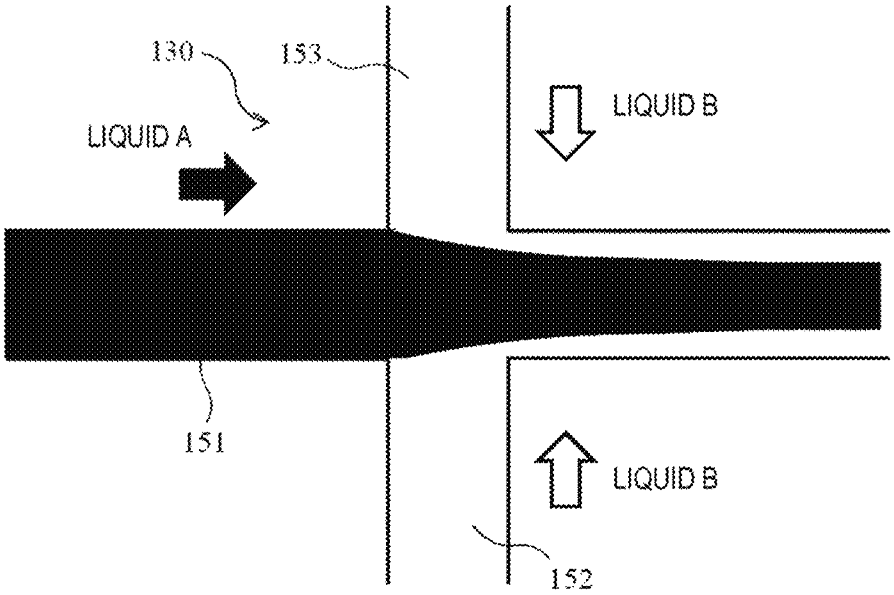

LIQUID MIXER, ELECTROLYTE ANALYSIS DEVICE, AND LIQUID MIXING METHOD

TECHNICAL FIELD

The present disclosure relates to a liquid mixer, an electrolyte analysis device, and a liquid mixing method.

BACKGROUND ART

A mixer using a flow path with a width of tens of micrometers to several millimeters has been developed as a mixer for efficiently mixing a plurality of liquids. For example, according to PTL 1, "A microreactor used in a two-liquid chemical reaction apparatus has a multilayer structure in which flow paths for two liquids are alternately disposed on a disk, the two liquids can be mixed from the vicinity of the outer peripheral portion of the disk, and thus the two liquids are capable of reacting with high efficiency and the reaction solution can be increased. In addition, it is possible to reduce the size of the microreactor while ensuring a reaction liquid volume". According to PTL 2, "The present invention has been completed based on the findings that an efficient reaction can be realized by causing introduction flow paths for raw material fluid introduction into a flow path to merge by gradual approach and causing the post-merging raw material fluids to form parallel flows in the flow path".

CITATION LIST

Patent Literature

PTL 1: JP2007-69137A
PTL 2: JP2007-61685A

SUMMARY OF INVENTION

Technical Problem

Each of the mixers disclosed in PTL 1 and PTL 2 requires liquid sending devices (for example, liquid sending pumps) for respectively sending liquids during two-liquid mixing and is premised on means for continuously sending and mixing two liquids using two liquid sending pumps. However, the necessity of two liquid sending devices for respectively sending two liquids results in device complexity. In addition, depending on the device, only one liquid sending device may be usable due to device limitations. In this case, it is impossible to efficiently mix a plurality of liquids.

Accordingly, the present disclosure provides a technique for efficiently mixing a plurality of liquids using a single liquid sending device.

Solution to Problem

In order to achieve the above object, a liquid mixer of the present disclosure includes: a first inflow path into which a first liquid flows; a second inflow path into which a second liquid flows; a liquid merging portion that is connected to the first inflow path and the second inflow path and where the first liquid and the second liquid merge; an outflow path that is connected to the liquid merging portion and where a merged liquid of the first liquid and the second liquid flows out; and a single liquid sending device installed between the second inflow path and the liquid merging portion. The liquid merging portion has a first flow path connected to the first inflow path and a second flow path connected to the second inflow path, the first flow path branches into at least two flow paths, the second flow path branches into at least two flow paths, one of the flow paths that have branched off the first flow path and one of the flow paths that have branched off the second flow path are connected to each other and merge, and the other one of the flow paths that have branched off the first flow path and the other one of the flow paths that have branched off the second flow path are connected to each other and merge on a downstream side and connected to the outflow path.

Further features related to the present disclosure will become apparent from the description of the specification and the accompanying drawings. In addition, the aspects of the present disclosure are achieved and attained by means of the elements and combinations of various elements and aspects of the following detailed description and claims. The description herein is merely exemplary and is not intended to limit the scope or application of the present disclosure in any manner.

Advantageous Effects of Invention

According to the present disclosure, it is possible to efficiently mix a plurality of liquids using only one liquid sending device. Problems, configurations, and effects other than those described above will be clarified by the following description of embodiments.

BRIEF DESCRIPTION OF DRAWINGS

FIG. 1 is a schematic diagram illustrating the overall configuration of a liquid mixer 100 according to a first embodiment.

FIG. 2 is a diagram illustrating a liquid mixing operation of the liquid mixer 100.

FIG. 4 is an enlarged view illustrating parallel flows of the liquid A and the liquid B in a merging portion 70.

FIG. 5 is a schematic diagram illustrating the flow states of the liquids A and B in a case where the liquid A has flowed out to a flow path 11 when the liquid A is suctioned.

FIG. 6 is an enlarged view of the merging portion 70 in the state of FIG. 5(*b*).

FIG. 7 is a schematic diagram illustrating the flow states of the liquids A and B in a case where the flow path 11, a flow path 12, and a flow path 13 are all equal in length and diameter.

FIG. 8 is an enlarged view of the merging portion 70 in the state of FIG. 7(*b*).

FIG. 10 is an enlarged view illustrating how the liquid A and the liquid B merge at a branching portion 71.

FIG. 11 is a schematic diagram illustrating the configuration of the liquid merging portion 1 according to a modification example of the first embodiment.

FIG. 12 is a schematic diagram illustrating the overall configuration of a liquid mixer 200 according to a second embodiment.

FIG. 13 is a schematic diagram illustrating the overall configuration of a liquid mixer 300 according to a third embodiment.

FIG. 14 is a diagram illustrating the result of a fluid simulation in the A-A cross section of FIG. 13.

FIG. 15 is a schematic diagram illustrating the overall configuration of a liquid mixer 500 according to a fifth embodiment.

FIG. 17 is a graph illustrating the results of liquid mixing experiments using the four types of liquid mixers.

FIG. 18 is a schematic diagram illustrating the overall configuration of a liquid mixer 600 according to a sixth embodiment.

FIG. 20 is an enlarged view of a merging portion 110.

FIG. 21 is a schematic diagram illustrating the overall configuration of a liquid mixer 601 according to a first modification example of the sixth embodiment.

FIG. 23 is a schematic diagram illustrating the overall configuration of a liquid mixer 603 according to a second modification example of the sixth embodiment.

FIG. 25 is an enlarged view of a merging portion 130.

DESCRIPTION OF EMBODIMENTS

Figure 3A:
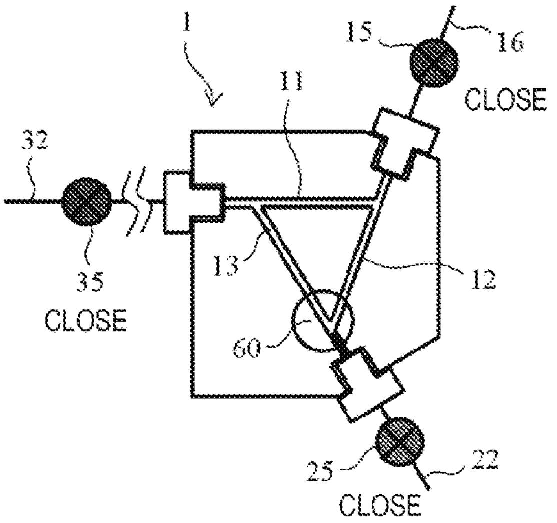
FIG. 3 is a schematic diagram illustrating the flow states of a liquid A and a liquid B in a liquid merging portion 1 during the liquid mixing operation.
Figure 3B:
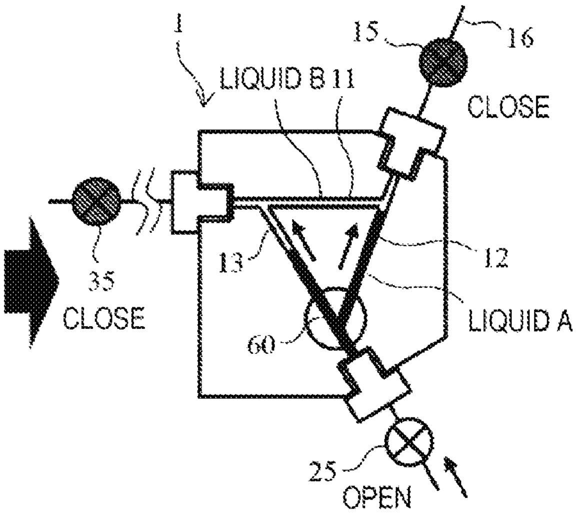
Figure 3C:
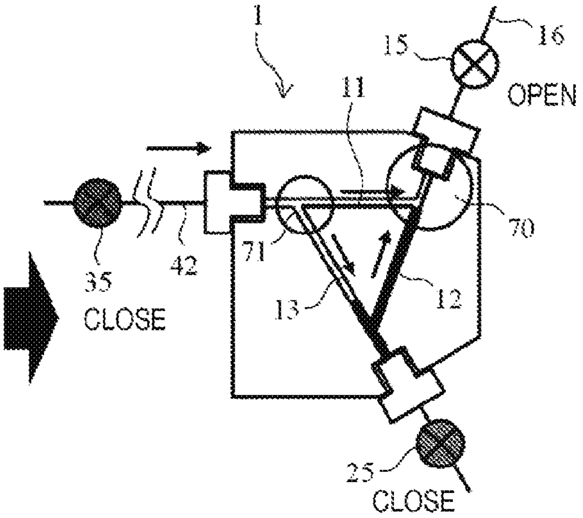
Figure 3D:
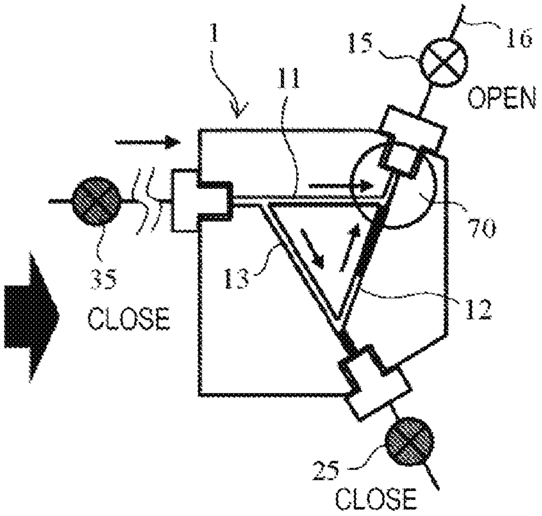
Figure 9A:
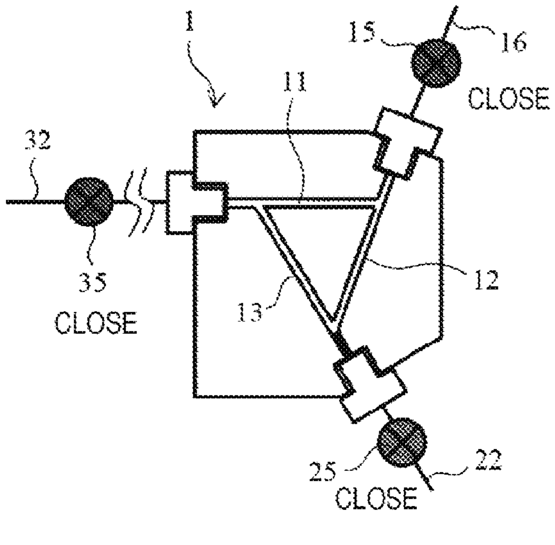
FIG. 9 is a schematic diagram illustrating the flow states of the liquid A and the liquid B in a case where the flow velocity is increased.
Figure 9B:
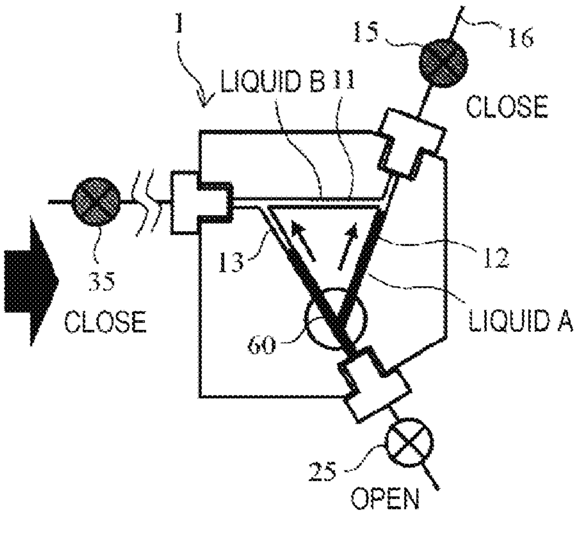
Figure 9C:
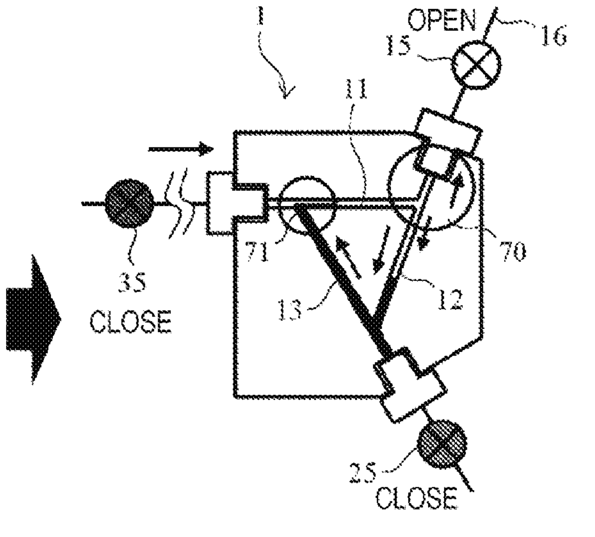
Figure 9D:
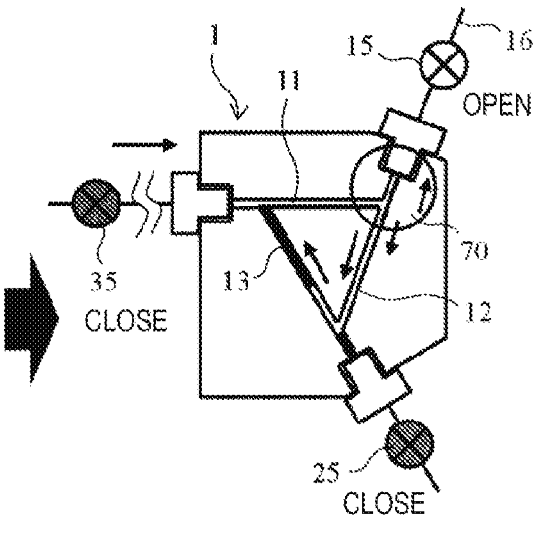
Figure 16A:
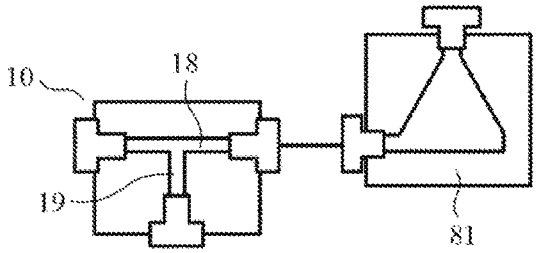
FIG. 16 is a schematic diagram illustrating the configurations of parts of four types of liquid mixers used in an experimental example.
Figure 16B:
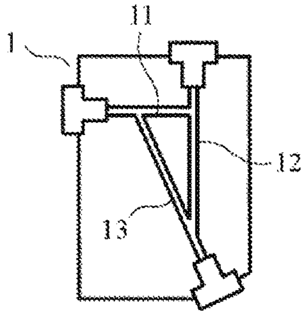
Figure 16C:
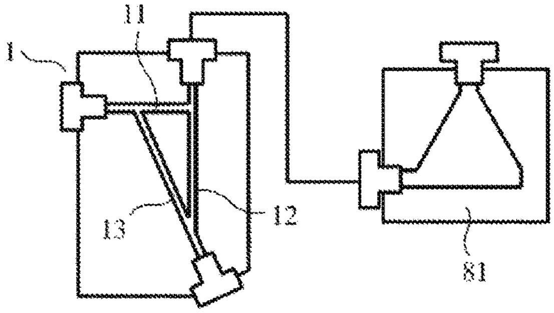
Figure 16D:
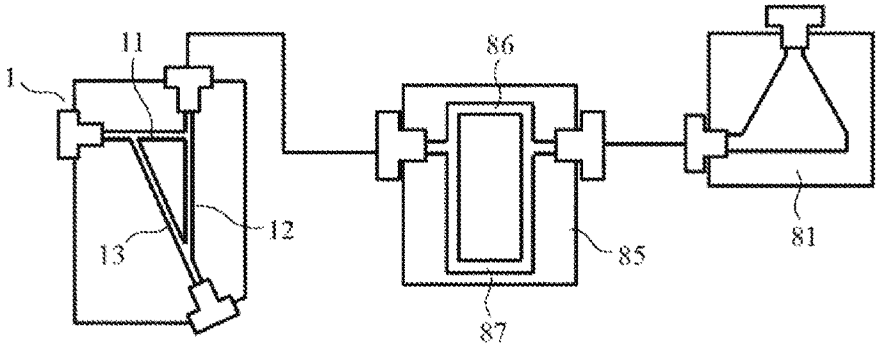

Hereinafter, embodiments of the present disclosure will be described with reference to the drawings. It should be noted that in each embodiment, the same configurations are denoted by the same reference numerals with redundant description omitted.

First Embodiment

<Configuration Example of Liquid Mixer>

FIG. 1 is a schematic diagram illustrating the overall configuration of a liquid mixer 100 according to a first embodiment. As illustrated in FIG. 1, the liquid mixer 100 includes a liquid merging portion 1, a control device 2, a liquid A holding container 21, an inflow path 22, a liquid B holding container 31, an inflow path 32, a liquid sending device 41, an inflow path 42, a valve 15, a valve 25, a valve 35, and an outflow path 16.

The liquid A holding container 21 holds a liquid A (first liquid). The liquid B holding container 31 holds a liquid B (second liquid). The liquid A holding container 21 and the liquid merging portion 1 are connected by the inflow path 22 (first inflow path). The valve 25 (first valve) is provided on the inflow path 22. The liquid B holding container 31 and the liquid sending device 41 are connected by the inflow path 32 (second inflow path). The valve 35 (second valve) is provided on the inflow path 32. The liquid sending device 41 is configured by, for example, a syringe pump or a plunger pump. The liquid sending device 41 and the liquid merging portion 1 are connected by the inflow path 42 (second inflow path). In other words, the liquid sending device 41 is installed between the valve 35 and the liquid merging portion 1. The outflow path 16 is connected to the liquid merging portion 1. The valve 15 (third valve) is provided on the outflow path 16. Examples of the material of the inflow paths 22, 32, and 42 and the outflow path 16 include a resin material such as PTFE and PFA and a metal material such as SUS316.

The control device 2 is, for example, a computer device. The control device 2 controls the opening and closing operations of the valves 15, 25, and 35 and the liquid sending operation of the liquid sending device 41 by a processor executing a program for operating the valves 15, 25, and 35 and the liquid sending device 41. By operating the valves 15, 25, and 35 and the liquid sending device 41, the liquids A and B are suctioned to the liquid merging portion 1 and merge, and the merged liquid obtained by merging the liquids A and B flows out of the outflow path 16.

The liquid merging portion 1 is configured from three linear flow paths 11 to 13. The flow path 13 (first flow path) is connected to the liquid A inflow path 22. The flow path 11 (second flow path) is connected to the liquid B inflow path 42. A flow path 14 that has branched off the flow path 11 at a branching portion 71 is the same flow path as the flow path 13 (hereinafter, simply referred to as "flow path 13" in the present embodiment). The flow path 12 (third flow path) is a flow path that has branched off the flow path 13 at a branching portion 60 and is connected to the outflow path 16. The flow path 11 merges with the flow path 12 at a merging portion 70. In other words, the flow path (first flow path) connected to the liquid A inflow path 22 branches into two flow paths (flow paths 12 and 13) at the branching portion 60. Meanwhile, the flow path (second flow path) connected to the liquid B inflow path 42 branches into two flow paths (flow paths 11 and 14) at the branching portion 71.

Although FIG. 1 illustrates a case where the angle of the branching portion 60 is an acute angle, the angle may be a right angle or an obtuse angle as the case may be.

Examples of the material of the liquid merging portion 1 include a resin material such as acryl, polycarbonate, polystyrene, PTFE, PFA, and PEEK, a metal material such as SUS and Hastelloy (registered trademark), and a ceramic material such as alumina and aluminum nitride. The flow paths 11 to 13 of the liquid merging portion 1 can be made by, for example, cutting (drilling) a block of any material. The cross-sectional shape of the flow paths 11 to 13 can be any shape such as circular and rectangular shapes.

<Liquid Mixing Method>

FIG. 2 is a diagram illustrating a liquid mixing operation of the liquid mixer 100. In the present embodiment, a case where 15 μL of liquid A and 450 μL of liquid B are mixed in one cycle will be described as an example.

In step S1, the control device 2 closes the valve 25, closes the valve 35, and closes the valve 15. This state is an initial state.

In step S2, the control device 2 opens the valve 25 and, with the valves 35 and 15 kept closed, drives the syringe of the liquid sending device 41 to perform a suction operation and suction 15 μL of liquid A from the liquid A holding container 21 to the liquid merging portion 1.

In step S3, the control device 2 closes the valve 25, opens the valve 35, and drives the syringe of the liquid sending device 41 with the valve 15 kept closed to perform a suction operation and suction 450 μL of liquid B from the liquid B holding container 31 to the liquid sending device 41.

In step S4, the control device 2 closes the valve 35 and opens the valve 15 with the valve 25 kept closed to drive the syringe of the liquid sending device 41 and perform a discharge operation. As a result, the liquid B is discharged from the liquid sending device 41 to the liquid merging portion 1, the liquids A and B merge in the liquid merging portion 1, and a total of 465 μL of merged liquid of the liquids A and B is discharged from the liquid merging portion 1.

FIGS. 3(*a*) to 3(*d*) are schematic diagrams illustrating the flow states of the liquid A and the liquid B in the liquid merging portion 1 during the liquid mixing operation. In FIG. 3, the valves 15, 25, and 35 that are closed are colored in gray and the valves 15, 25, and 35 that are open are colorless. It should be noted that the liquid sending device 41 is not illustrated in FIG. 3.

FIG. 3(*a*) illustrates the initial state in step S1. In the initial state, the upstream side of the flow path 13, that is, the side upstream of the branching portion 60 is filled with the liquid A and the other part is filled with the liquid B.

FIG. 3(*b*) illustrates the state during the liquid A suctioning in step S2. In step S2, the liquid A is suctioned from the liquid A holding container 21, and the liquid A splits into two directions at the branching portion 60 to flow into the flow path 12 and the flow path 13. At this time, the sum of the volume of the flow path 12 and the volume of the flow path 13 is designed to be larger than the volume of the liquid A to be suctioned (15 μL in the present embodiment) such that the suctioned liquid A does not flow out to the flow path 11. The diameters and lengths of the flow path 12 and the flow path 13 are designed such that the sum of the volume of the flow path 12 and the volume of the flow path 13 is larger than the volume of the liquid A to be suctioned as described above. Although details will be described later, a decline in mixing efficiency may occur if the liquid A flows out to the flow path 11.

In step S3, when the liquid B is suctioned from the liquid B holding container 31 to the liquid sending device 41, the states of the liquids A and B in the liquid merging portion 1 are as in FIG. 3(*b*) without change.

FIGS. 3(*c*) and 3(*d*) illustrate the state during the discharge operation in step S4. In the discharge operation, first, as illustrated in FIG. 3(*c*), the liquid B flows into the liquid merging portion 1 through the inflow path 42 and branches into the flow path 11 and the flow path 13 at the branching portion 71. After that, as illustrated in FIG. 3(*d*), the liquid B that has branched to the flow path 13 washes away the liquid A originally held in the flow path 13 and the flow path 12. As a result, the liquid B that has flowed from the flow path 11 and the liquid A that has flowed from the flow path 12 merge at the merging portion 70. At this time, parallel flows of the liquid A and the liquid B are formed.

FIG. 4 is an enlarged view illustrating the parallel flows of the liquid A and the liquid B at the merging portion 70. By forming the parallel flows of the liquid A and the liquid B in this manner, the area of contact between the liquid A and the liquid B increases and the distance of diffusion decreases, and thus the liquid A and the liquid B are mixed with speed and efficiency. It should be noted that although the liquid A flows on the right side of the flow path and the liquid B flows on the left side of the flow path in the parallel flows illustrated in FIG. 4, according to the result of diligent studies by the inventors of the present invention, the liquid A flows on the left side of the flow path and the liquid B flows on the right side of the flow path in the parallel flows when the flow velocity of the liquid B flowing through the flow path 11 increases. For example, in a case where the flow path 11 is 1.1 mm in diameter and 10 mm in length, the flow path 12 is 1.2 mm in diameter and 22 mm in length, and the flow path 13 is 1.2 mm in diameter and 24 mm in length, parallel flows as illustrated in FIG. 4 are formed when the speed of discharge by the liquid sending device 41 is 3.2 mL/min, and parallel flows opposite in disposition to FIG. 4 are formed when the discharge speed is 32 mL/min.

The state returns to the initial state (FIG. 3(*a*)) when the liquid B that has branched to the flow path 13 causes the liquid A held in the flow path 13 and the flow path 12 to flow fully and completely. By repeating the above operations (steps S1 to S4), the liquid A and the liquid B can be efficiently mixed using the single liquid sending device 41.

<Regarding Flow Path Volume>

As described above, the sum of the volume of the flow path 12 and the volume of the flow path 13 is designed to be larger than the volume of the liquid A to be suctioned in order to prevent the liquid A from flowing out to the flow path 11 when the liquid A is suctioned by the liquid sending device 41 in step S2. The reason for this will be described below.

FIGS. 5(*a*) and 5(*b*) are schematic diagrams illustrating the flow states of the liquids A and B in a case where the liquid A has flowed out to the flow path 11 when the liquid A is suctioned. FIG. 5(*a*) illustrates a state where the liquid A has flowed out to the flow path 11 when the liquid A has been suctioned by the liquid sending device 41 in the operation of step S2. From this state, the liquid B is suctioned to the liquid sending device 41 in step S3, the discharge operation is performed in step S4, and then the state illustrated in FIG. 5(*b*) is reached. As illustrated in FIG. 5(*b*), the liquid A that has flowed out to the flow path 11 is washed away by the liquid B.

FIG. 6 is an enlarged view of the merging portion 70 in the state of FIG. 5(*b*). As can be seen from FIG. 6, in this state, the liquid A from the flow path 11 and the liquid A from the flow path 12 merge at the merging portion 70, and the liquid A and the liquid B cannot be mixed. As a result, a decline in mixing efficiency occurs. In other words, a decline in mixing efficiency occurs when the liquid A flows out to the flow path 11 by the liquid A being suctioned. Therefore, by making the sum of the volume of the flow path 12 and the volume of the flow path 13 larger than the volume of the liquid A to be suctioned, it is possible to prevent the liquid A from flowing out to the flow path 11 when the liquid A is suctioned. Considering the diffusion and velocity distribution of the liquid A with respect to the flow direction, it is possible to more reliably prevent the liquid A from flowing out to the flow path 11 by the sum of the volume of the flow path 12 and the volume of the flow path 13 being at least twice the volume of the liquid A to be suctioned.

<Regarding Relationship Between Flow Paths>

Next, the dimensional relationship of the flow paths 11 to 13 will be described.

FIGS. 7(*a*) and 7(*b*) are schematic diagrams illustrating the flow states of the liquids A and B in a case where the flow paths 11 to 13 are all equal in length and diameter. As described above, when the liquid A is suctioned in step S2 (FIG. 3(*b*)), the liquid A is caused to branch into the flow path 13 and the flow path 12 at the branching portion 60. Here, in a case where, for example, the flow paths 11 to 13 are all equal in length and diameter, the sum of the resistance of the flow path 11 and the resistance of the flow path 12 exceeds the resistance of the flow path 13. Therefore, more liquid A flows into the flow path 13 than into the flow path 12 as illustrated in FIG. 7(*a*). From this state, the liquid B is suctioned to the liquid sending device 41 in step S3, the discharge operation is performed in step S4, and then the state illustrated in FIG. 7(*b*) is reached.

FIG. 8 is an enlarged view of the merging portion 70 in the state of FIG. 7(*b*). As can be seen from FIG. 8, in this state, the liquid B from the flow path 11 and the liquid B from the flow path 12 merge at the merging portion 70, and the liquid A and the liquid B cannot be mixed. As a result, a decline in mixing efficiency occurs. Therefore, for the liquid A to be suctioned up to the vicinity of the merging portion 70 of the flow path 12 in step S2, in a case where the diameter of the flow path 12 and the diameter of the flow path 13 are equal to each other, the length of the flow path 12 needs to be shorter than the length of the flow path 13. Alternatively, in a case where the length of the flow path 12 and the length of the flow path 13 are equal to each other, the diameter of the flow path 12 needs to be larger than the diameter of the flow path 13. Therefore, at least, the length of the flow path 12 is designed to be shorter than the length of the flow path 13 or the diameter of the flow path 12 is designed to be larger than the diameter of the flow path 13.

The shapes of the flow path 12 and the flow path 13 are determined such that the sum of the volume of the flow path 13 and the volume of the flow path 12 is larger than the volume of the liquid A to be suctioned and the length of the flow path 12 is shorter than the length of the flow path 13 or the diameter of the flow path 12 is larger than the diameter of the flow path 13 as described above.

Based on the above, the length and diameter of the flow path 11 are determined in accordance with the mixing ratio of the liquid A and the liquid B. In other words, the length and diameter of the flow path 11 are determined such that the liquid B branches at the branching portion 71 in accordance with the mixing ratio in the discharge operation of step S4. The length and diameter of the flow path 11 are determined such that the ratio of the resistance of the flow path 11 and the resistance of the route of flow through the flow path 12 from the flow path 13 matches the mixing ratio. Although the mixing ratio of the liquid A and the liquid B is 1:30 in the present embodiment, considering the diffusion of the liquid A in the flow direction, the liquid residue on the flow path wall, and so on, the length and diameter of the flow path 11 can be determined such that the ratio of the resistance of the flow path 11 and the resistance of the route of flow through the flow path 12 from the flow path 13 exceeds 1:30 (in the case of 1:30, the resistance ratio is defined as 1/30), examples of which include approximately 1:5 to 1:25 (1/25 to 1/5). In other words, comparing the flow path 11 with the flow path 13 in a case where the resistance ratio is, for example, 1:20, at least the length of the flow path 11 is shorter than the flow path 13 in a case where the diameter of the flow path 11 and the diameter of the flow path 13 are equal to each other or the diameter of the flow path 11 is larger than the diameter of the flow path 13 in a case where the length of the flow path 11 and the length of the flow path 13 are equal to each other. This is determined by the mixing ratio of the liquid A and the liquid B that flow. In a case where the volume of the liquid A is smaller than the volume of the liquid B, at least the length of the flow path 11 is formed shorter than the length of the flow path 13 or the diameter of the flow path 11 is formed larger than the diameter of the flow path 13. It should be noted that although the expression of "diameter of flow path" is used on the assumption that each flow path has a circular cross-sectional shape in the present embodiment, "diameter of flow path" can be rephrased as "hydraulic diameter" in a case where the shape of each flow path is not circular. Assuming that the hydraulic diameter is $D_H$, the cross-sectional area of the flow path is A, and the wetted perimeter length (peripheral length of flow path cross section in contact with fluid) is S, the hydraulic diameter $D_H$ is expressed as $D_H=4A/S$.

<Regarding Flow Velocity>

Next, the effect of the flow velocity during the discharge operation will be described.

FIGS. 9(*a*) to 9(*d*) are schematic diagrams illustrating the flow states of the liquid A and the liquid B in a case where the flow velocity is increased. FIG. 9(*a*) illustrates the initial state and FIG. 9(*b*) illustrates the state immediately after the liquid A is suctioned, which are the same as FIGS. 3(*a*) and 3(*b*), respectively. The inventors of the invention have found that a change in the speed of discharge by the liquid sending device 41 leads to a change in flow in the liquid merging portion 1 when the discharge operation is performed in the operation of step S4. The flow is as described with reference to FIG. 3 in a case where the discharge speed is relatively low. On the other hand, the flow is as illustrated in FIGS. 9(*c*) and 9(*d*) in a case where the discharge speed is increased. As illustrated in FIG. 9(*c*), in a case where the discharge speed is high, most of the liquid B discharged by the liquid sending device 41 proceeds straight through the flow path 11 without branching at the branching portion 71. Then, at the merging portion 70, the liquid B branches into the upper flow path and the lower flow path of the merging portion 70. After that, as illustrated in FIG. 9(*d*), the liquid B that has branched to the lower flow path of the merging portion 70 washes away the liquid A held in the flow path 12 and the flow path 13, and the liquid A and the liquid B merge at the branching portion 71 to form parallel flows.

FIG. 10 is an enlarged view illustrating how the liquid A and the liquid B merge at the branching portion 71. As illustrated in FIG. 10, when the discharge speed increases, the flow directions in the flow path 12 and the flow path 13 become opposite to those in FIG. 3 and the merging portion of the liquid A and the liquid B changes to the branching portion 71. For example, in a case where the flow path 11 is 1.5 mm in diameter and 10 mm in length, the flow path 12 is 1.1 mm in diameter and 15 mm in length, and the flow path 13 is 1.1 mm in diameter and 18 mm in length, the flow is as illustrated in FIG. 3 when the speed of discharge by the liquid sending device 41 is 12 mL/min or less and the flow becomes opposite in direction to that in FIG. 2, as in FIG. 9, when the discharge speed becomes higher than 12 mL/min. In addition, in a case where the flow path 12 is 1.1 mm in diameter and 15 mm in length and the flow path 13 is 1.1 mm in diameter and 18 mm in length, when the diameter of the flow path 11 is changed with the flow path 11 being 10 mm in length and the speed of discharge by the liquid sending device 41 is 32 mL/min, the flow is as in FIG. 3 if the diameter of the flow path 11 is 1.2 mm or less, and the flow becomes opposite in direction to that in FIG. 3, as in FIG. 9, if the diameter of the flow path 11 becomes larger than 1.2 mm.

As described above, the parallel flows of the liquid A and the liquid B are formed at the merging portion 70 or the branching portion 71 at high and low discharge speeds alike, and thus the liquids can be mixed efficiently.

<Summary of First Embodiment>

As described above, the liquid mixer 100 according to the first embodiment includes the inflow path 22 (first inflow path) into which the liquid A (first liquid) flows, the inflow paths 32 and 42 (second inflow paths) into which the liquid B (second liquid) flows, the liquid merging portion 1 that is connected to the inflow path 22 and the inflow path 42 and where the liquid A and the liquid B merge, the outflow path 16 that is connected to the liquid merging portion 1 and where the merged liquid of the liquid A and the liquid B flows out, and the single liquid sending device 41 installed between the inflow path 32 and the liquid merging portion 1. The liquid merging portion 1 has the flow path 13 (first flow path) connected to the inflow path 22 and the flow path 11 (second flow path) connected to the inflow path 42. The flow path 13 branches into two flow paths (flow paths 12 and 13), the flow path 11 branches into two flow paths (flow paths 11 and 14), the flow path 13 and the flow path 14 are connected to each other and merge, and the flow path 11 and the flow path 12 that has branched off the flow path 13 are connected to each other and merge at the merging portion 70 (downstream side) and connected to the outflow path 16.

With such a configuration, parallel flows can be formed at the merging portion of the flow paths 11 and 12 or the branching portion 71 of the flow paths 11 and 13. Therefore, the liquids A and B can be mixed efficiently.

Modification Example of First Embodiment

Although the liquid merging portion 1 including the three linear flow paths 11 to 13 as illustrated in FIG. 3 has been described in the first embodiment, not every flow path need to be linear.

FIG. 11 is a schematic diagram illustrating the configuration of the liquid merging portion 1 according to a modification example. In the example of FIG. 11, the flow path 13 and the flow path 14 are connected at right angles at an elbow portion 61. As a result, the angle of the branching portion 60 is moderated and the liquid residue after the discharge in step S4 can be reduced. Further, the corners of the branching portion 60 and the elbow portion 61 may be rounded or curved. The liquid residue can be further reduced in that case. It should be noted that the angle of the elbow portion 61 is not limited to a right angle and can be any angle.

In the configuration of FIG. 11, the flow path 12 is connected to the liquid A inflow path 22. The flow path 11 is connected to the liquid B inflow path 42, extends linearly, and is connected to the outflow path 16. The flow path 12 is connected to the liquid A inflow path 22, extends linearly, and merges with the flow path 11 at the merging portion 70. The flow path 13 is a flow path that has branched off the flow path 12 at the branching portion 60. The flow path 14 is a flow path that has branched off the flow path 11 at the branching portion 71. The flow path 13 and the flow path 14 are connected at right angles. In other words, the flow path (first flow path) connected to the liquid A inflow path 22 branches into two flow paths (flow paths 12 and 13) at the branching portion 60. Meanwhile, the flow path (second flow path) connected to the liquid B inflow path 42 branches into two flow paths (flow path 11 and flow path 14) at the branching portion 71.

The liquid merging portion 1 that has the structure as illustrated in FIG. 11 can be made by, for example, cutting and assembling (for example, welding) a plurality of blocks made of any material.

Second Embodiment

In the first embodiment, the liquids A and B being merged by the liquid merging portion 1 has been described. On the other hand, in a second embodiment, a configuration is proposed in which the merged liquid is further mixed on the downstream side of the liquid merging portion 1.

<Configuration Example of Liquid Mixer>

FIG. 12 is a schematic diagram illustrating the overall configuration of a liquid mixer 200 according to the second embodiment. The liquid mixer 200 differs from the liquid mixer 100 of the first embodiment in that a liquid mixing portion 80 is further provided on the downstream side of the liquid merging portion 1. The liquid mixing portion 80 is an extension flow path connected to the downstream side of the outflow path 16. The liquid mixing portion 80 is a coil-shaped flow path in the example of FIG. 12. The liquid mixing portion 80 may be a linear flow path. It should be noted that the control device 2 is not illustrated in FIG. 12.

According to this configuration, the merged liquid of the liquid A and the liquid B merged in the liquid merging portion 1 is introduced into the liquid mixing portion 80, and mixing is promoted in the process of passing through the liquid mixing portion 80. In other words, the time of stay is increased and mixing is promoted by passage through the liquid mixing portion 80. As a result, the liquids can be mixed more efficiently.

Third Embodiment

In the second embodiment, the liquid mixing portion 80 in the form of a coil-shaped flow path has been described. In a third embodiment, a liquid mixing portion that is different in shape is proposed.

<Configuration Example of Liquid Mixer>

FIG. 13 is a schematic diagram illustrating the overall configuration of a liquid mixer 300 according to the third embodiment. It should be noted that the control device 2 is not illustrated in FIG. 13. The liquid mixer 300 differs from the liquid mixer 200 of the second embodiment in that a liquid mixing portion 81 with a substantially conical internal space (cavity portion), an inflow path 83, and an outflow path 84 are provided. The liquid mixing portion 81 can be made by, for example, combining a member with a columnar recessed portion and a member with a conical recessed portion such that the recessed portions face each other. Examples of the material of the liquid mixing portion 81 include a resin material such as acryl, polycarbonate, polystyrene, PTFE, PFA, and PEEK, a metal material such as SUS and Hastelloy (registered trademark), and a ceramic material such as alumina and aluminum nitride.

The liquid mixing portion 81 is disposed such that the columnar recessed portion is positioned vertically below and the conical recessed portion is positioned vertically above. The inflow path 83 is connected to the downstream side of the outflow path 16, and the bottom portion of the liquid mixing portion 81 is connected to the downstream side of the inflow path 83. The outflow path 84 is connected to the top portion of the liquid mixing portion 81.

According to this configuration, the merged liquid of the liquid A and the liquid B merged in the liquid merging portion 1 is introduced into the liquid mixing portion 81, mixed in the liquid mixing portion 81, and discharged from the outflow path 84.

FIG. 14 is a diagram illustrating the result of a fluid simulation in the A-A cross section of FIG. 13 in a case where the parallel flows of the liquid A and the liquid B that are hardly mixed with each other are introduced into the liquid mixing portion 81. As can be seen from FIG. 14, the merged liquid of the liquid A and the liquid B introduced into the liquid mixing portion 81 forms spiral multilayer parallel flows. As a result, the area of contact between the liquid A and the liquid B increases and the distance of diffusion decreases, and thus the mixing efficiency can be improved. Further, in the substantially conical liquid mixing portion 81 of the present embodiment as compared with the configuration of the coil-shaped liquid mixing portion 80 of the second embodiment, the cross-sectional area of the flow path can be increased at the same volume, and thus pressure loss can be reduced. Therefore, the load on the liquid sending device 41 can be reduced and the mixing efficiency can be improved.

Although the internal space of the liquid mixing portion 81 is substantially conical in the present embodiment, the space may have the shape of a column, a polygonal prism, a polygonal pyramid, a sphere, a hemisphere, a combination thereof, or the like.

Fourth Embodiment

The liquid mixer 300 provided with the liquid mixing portion 81 has been described in the third embodiment. In a fourth embodiment, a configuration is proposed in which the diameter of the outflow path 16 connecting the liquid merging portion 1 and the liquid mixing portion 81 is reduced. In the present embodiment, the diameter of the outflow path 16 is, for example, 0.5 mm or less.

When the parallel flows of the liquid A and the liquid B merged in the liquid merging portion 1 are introduced into the outflow path 16 that is small in diameter, the width of each layer of the liquid A and the liquid B is reduced. As a result, the distance of diffusion decreases, and thus mixing is promoted. Further, introduction into the liquid mixing portion 81 in that state results in a spiral flow of the liquid A and the liquid B small in width, which results in parallel flows of the liquid A and the liquid B larger in number than in the third embodiment. Therefore, the distance of diffusion decreases, the area of contact between the liquid A and the liquid B increases, and thus mixing is further promoted. In addition, in a case where the flow velocity is high, the flow velocity further increases in the small-diameter outflow path 16. As a result, introduction into the liquid mixing portion 81 that is large in volume results in a jet flow and flow turbulence and mixing is further promoted in the liquid mixing portion 81. In the present embodiment, only the diameter of the outflow path 16 is reduced, and thus an increase in pressure loss can be suppressed and mixing can be promoted while the load on the liquid sending device 41 is also suppressed.

Fifth Embodiment

The liquid mixer 300 provided with the liquid mixing portion 81 has been described in the third embodiment. In a fifth embodiment, a configuration is proposed in which the concentration unevenness of the liquid A and the liquid B is made uniform on the upstream side of the liquid mixing portion 81 so that mixing of the liquids A and B is further promoted.

<Configuration Example of Liquid Mixer>

FIG. 15 is a schematic diagram illustrating the overall configuration of a liquid mixer 500 according to the fifth embodiment. The liquid mixer 500 differs from the liquid mixer 300 of the third embodiment in that a branching and merging flow path 85 is connected between the liquid merging portion 1 and the liquid mixing portion 81. It should be noted that the control device 2 is not illustrated in FIG. 15.

The branching and merging flow path 85 has a flow path 86 and a flow path 87 (fourth flow path and fifth flow path), a branching portion 88, and a merging portion 89. The flow path 86 and the flow path 87 are a combination of flow paths that are different in length or hydraulic diameter. The cross-sectional shapes of the flow path 86 and the flow path 87 are, for example, circular, rectangular, semicircular, or elliptical. When the merged liquid of the liquid A and the liquid B that has flowed through the outflow path 16 flows into the branching and merging flow path 85, the liquid branches into the flow path 86 and the flow path 87 at the branching portion 88 and the liquids remerge at the merging portion 89. Since the flow path 86 and the flow path 87 are different in length or hydraulic diameter, the fluids that merge at the merging portion 89 merge in a combination different from the combination of the fluids that have branched at the branching portion 88. As a result, in a case where the concentration is uneven in the flow direction, that is, between the upstream side and the downstream side, the concentration can be made uniform by the branching and merging flow path 85.

<Experimental Example of Liquid Mixing with Liquid Mixer>

FIGS. 16(*a*) to 16(*d*) are schematic diagrams illustrating the configurations of parts of the four types of liquid mixers used in this experimental example. The inventors of the invention made the following four types of liquid mixers (FIGS. 16(*a*) to (*d*)) and actually conducted an experiment in which 15 μL of liquid A and 450 μL of liquid B were mixed.

FIG. 16(*a*) illustrates a part of a liquid mixer including a simple T-shaped merging instrument 10 and the liquid mixing portion 81 of the third embodiment. The T-shaped merging instrument 10 has flow paths 18 and 19 connected in a T shape. A valve (not illustrated) and a flow path (not illustrated) are connected to the T-shaped merging instrument 10 as in the case of the liquid merging portion 1 described in the first embodiment. In the liquid mixer with the configuration illustrated in FIG. 16(*a*), an alternating flow in which the liquid A and the liquid B flow alternately is generated by operating the valve and the liquid sending device 41 as in the first embodiment. The flow path 18 was 0.9 mm in diameter and 9 mm in length. The flow path 19 was 0.5 mm in diameter and 3.5 mm in length.

FIG. 16(*b*) illustrates a part of a liquid mixer provided only with the liquid merging portion 1 described in the first embodiment. The flow path 11 of the liquid merging portion 1 was 1.1 mm in diameter and 10 mm in length. The flow path 12 was 1.2 mm in diameter and 22 mm in length. The flow path 13 was 1.2 mm in diameter and 24 mm in length.

FIG. 16(*c*) illustrates a part of a liquid mixer including the liquid merging portion 1 and the liquid mixing portion 81 described in the third embodiment. The diameters and lengths of the flow paths 11 to 13 were the same as in FIG. 16(*b*).

FIG. 16(*d*) illustrates a part of a liquid mixer including the liquid merging portion 1, the branching and merging flow path 85, and the liquid mixing portion 81 described in the fifth embodiment. The diameters and lengths of the flow paths 11 to 13 were the same as in FIG. 16(*b*). The flow path 86 of the branching and merging flow path 85 was 0.8 mm in diameter and 11 mm in length. The flow path 87 was 1.2 mm in diameter and 56 mm in length.

FIGS. 17(*a*) to 17(*d*) are graphs illustrating the results of liquid mixing experiments using the four types of liquid mixers. FIGS. 17(*a*) to 17(*d*) correspond to the results of experiments using the liquid mixers illustrated in FIGS. 16(*a*) to 16(*d*), respectively. The horizontal axis of each graph in FIG. 17 indicates time, and the vertical axis indicates volume concentration. It should be noted that each graph was obtained by extracting the volume concentration value on the measurement surface during the discharge operation in step S4 in FIG. 2 and performing graphing. Coefficients of variation indicating concentration variations ((concentration standard deviation)/(concentration average)×100) were calculated, and the result was 21.6% in the case of FIG. 17(*a*), 5.3% in the case of FIG. 17(*b*), 1.8% in the case of FIG. 17(*c*), and 0.8% in the case of FIG. 17(*d*). Therefore, it has been confirmed that the mixing efficiency can be considerably improved in the configuration of the first embodiment (FIG. 16(*b*)), the configuration of the third embodiment (FIG. 16(*c*)), and the configuration of the fifth embodiment (FIG. 16(*d*)) as compared with the configuration (FIG. 16(*a*)) of mixing with the T-shaped merging instrument 10 and the liquid mixing portion 81. In addition, it has been confirmed that the mixing efficiency can be improved by 75% in FIG. 17(*b*) as compared with FIG. 17(*a*), by 92% in FIG. 17(*c*) as compared with FIG. 17(*a*), and by 96% in FIG. 17(*d*) as compared with FIG. 17(*a*).

Sixth Embodiment

In the configuration described in the first embodiment, the liquid merging portion 1 has the three linear flow paths 11 to 13. In a sixth embodiment, another flow path configuration of the liquid merging portion 1 is proposed.

<Configuration Example of Liquid Mixer>

FIG. 18 is a schematic diagram illustrating the overall configuration of a liquid mixer 600 according to the sixth embodiment. The liquid mixer 600 differs from the liquid merging portion 1 of the liquid mixer 100 of the first embodiment in the flow path configuration of a liquid merging portion 6. As illustrated in FIG. 18, the liquid merging portion 6 has flow paths 101 to 108. The flow path 101 is connected to the inflow path 22, the liquid A flows into the flow path 101, and the flow path 101 branches into the two flow paths 106 and 107. Meanwhile, the flow path that is connected to the inflow path 42 and into which the liquid B flows branches into the three flow paths 102, 104, and 108. The flow paths that have branched off the liquid A inflow path and the liquid B inflow path in this manner are respectively connected and merge on the downstream side as described below. In other words, the flow path 102 and the flow path 106 merge, the flow path 104 and the flow path 107 merge, and the flow path 103, the flow path 105, and the flow path 108 merge.

Figure 19A:
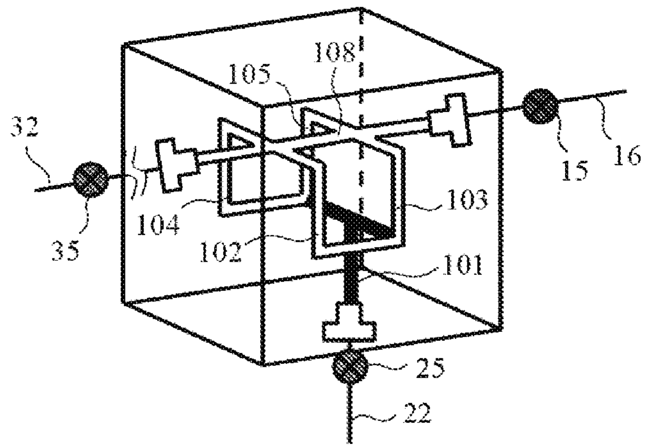
FIG. 19 is a schematic diagram illustrating the flow states of the liquids A and B in a liquid merging portion 6.
Figure 19B:
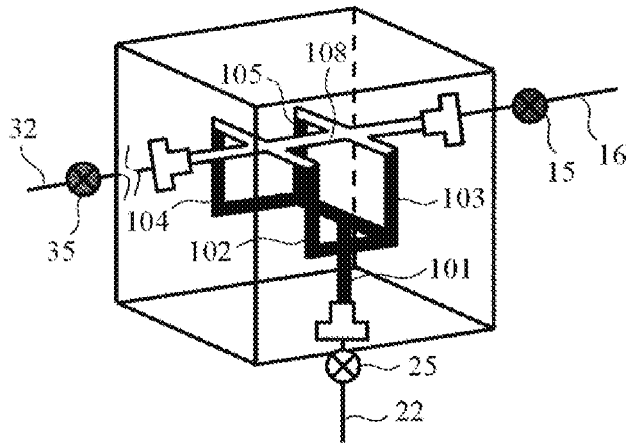
Figure 19C:
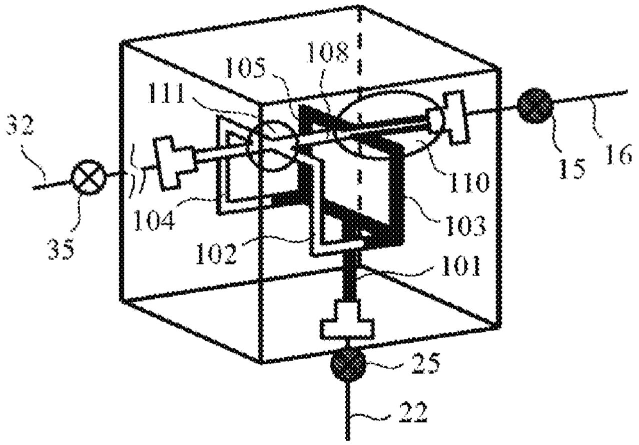

FIGS. 19(*a*) to 19(*c*) are schematic diagrams illustrating the flow states of the liquids A and B in the liquid merging portion 6 of the present embodiment. FIG. 19(*a*) illustrates the initial state. From this state, the liquid A is suctioned in the operation of step S2 (FIG. 2), and then the liquid A is held in the flow paths 102, 103, 104, and 105 as illustrated in FIG. 19(*b*). Further, the liquid B is discharged in the operation of step S4 after the liquid B is suctioned to the liquid sending device 41 in the operation of step S3, and then the liquid B branches into the three directions of the main flow path 108 and the two branching flow paths 102 and 104 at a branching portion 111 as illustrated in FIG. 19(*c*). Then, the liquid B that has branched into the flow paths 102 and 104 washes away the liquid A held in the flow paths 102, 103, 104, and 105 in FIG. 19(*b*), and the liquid B that has flowed through the flow path 108 and the liquid A that has flowed through the flow paths 103 and 105 merge at a merging portion 110.

FIG. 20 is an enlarged view of the merging portion 110 in the state of FIG. 19(*c*). As illustrated in FIG. 20, by the liquid B that has flowed through the flow path 108 and the liquid A that has flowed through the flow paths 103 and 105 merging at the merging portion 110, a so-called sheath flow in which the liquid B is sandwiched from both sides by the liquid A is formed. In this state, the area of contact between the liquid A and the liquid B further increases and the distance of diffusion decreases as compared with the 1:1 parallel flows of the liquid A and the liquid B, and thus mixing is promoted.

Modification Example of Sixth Embodiment

Another configuration example of the flow path forming the sheath flow described above will be described.

FIG. 21 is a schematic diagram illustrating the overall configuration of a liquid mixer 601 according to a first modification example of the sixth embodiment. A liquid merging portion 602 of the liquid mixer 601 has the flow paths 103, 105, 108, 109 and 140. The flow path that is connected to the inflow path 22 and into which the liquid A flows branches into the three flow paths 103, 105, and 109. Meanwhile, the flow path that is connected to the inflow path 42 and into which the liquid B flows branches into the two flow paths 108 and 140. The flow path 109 that has branched off the flow path into which the liquid A flows and the flow path 140 that has branched off the flow path into which the liquid B flows are connected to each other to become one flow path. In addition, the flow paths 103 and 105 that have branched off the flow path into which the liquid A flows merge at a merging portion 120 with the flow path 108 that has branched off the flow path into which the liquid B flows.

Figure 22A:
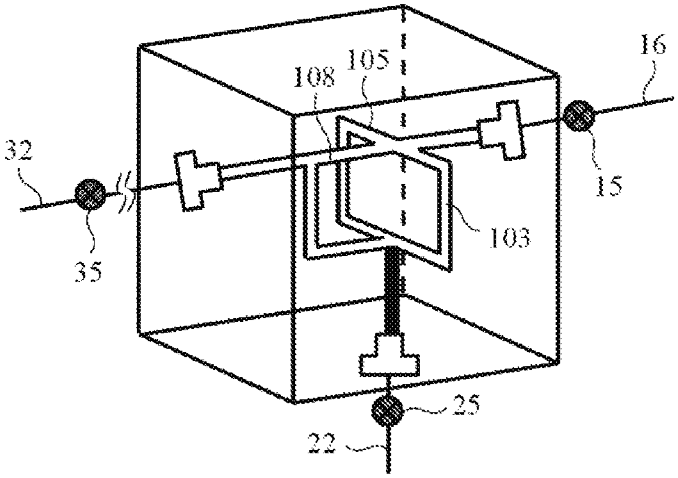
FIG. 22 is a schematic diagram illustrating the flow states of the liquids A and B in a liquid merging portion 602.
Figure 22B:
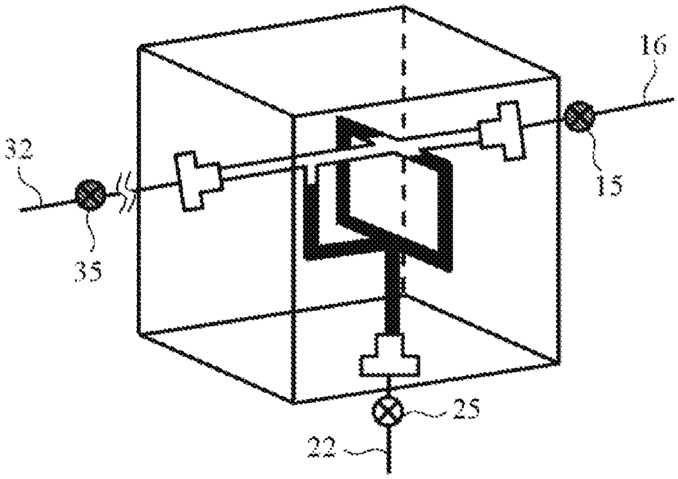
Figure 22C:
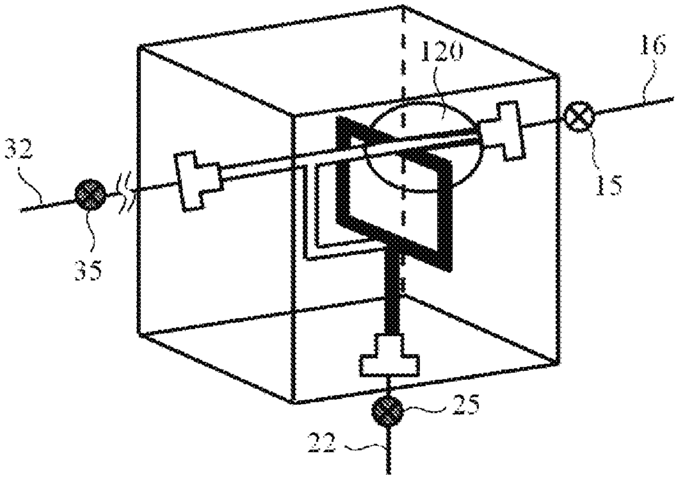

FIG. 22 is a schematic diagram illustrating the flow states of the liquids A and B in the liquid merging portion 602 of this modification example. FIG. 22(*a*) illustrates the initial state. FIG. 22(*b*) illustrates the state immediately after the liquid A is suctioned. FIG. 22(*c*) illustrates a state where the liquid B is in the process of discharge, in which a sheath flow similar to that in FIG. 20 can be formed at the merging portion 120.

FIG. 23 is a schematic diagram illustrating the overall configuration of a liquid mixer 603 according to a second modification example of the sixth embodiment. A liquid merging portion 604 of the liquid mixer 603 has flow paths 150 to 154. The flow path that is connected to the inflow path 22 and into which the liquid A flows branches into the two flow paths 150 and 151. Meanwhile, the flow path that is connected to the inflow path 42 and into which the liquid B flows branches into the three flow paths 152, 153, and 154. The flow path 150 that has branched off the flow path into which the liquid A flows and the flow path 154 that has branched off the flow path into which the liquid B flows are connected to each other to become one flow path. In addition, the flow path 151 that has branched off the flow path into which the liquid A flows and the flow paths 152 and 153 that have branched off the flow path into which the liquid B flows merge with each other at a merging portion 130 on the downstream side.

Figure 24A:
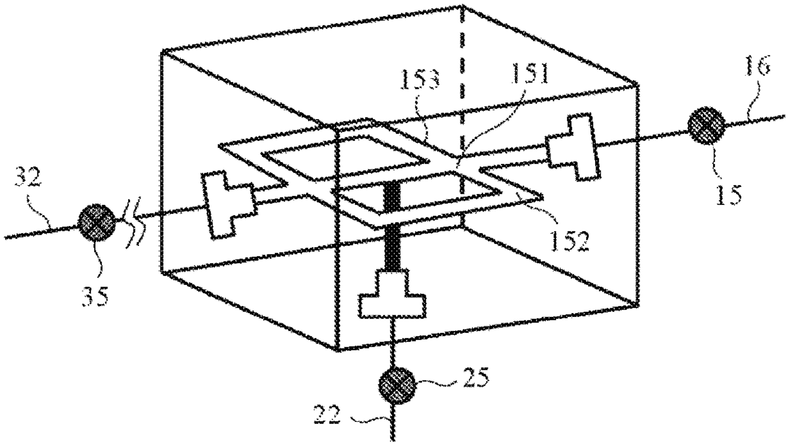
FIG. 24 is a schematic diagram illustrating the flow states of the liquids A and B in a liquid merging portion 604.
Figure 24B:
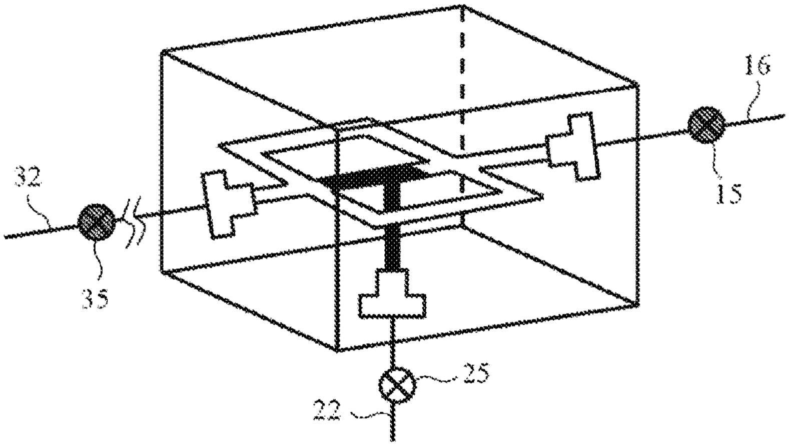
Figure 24C:
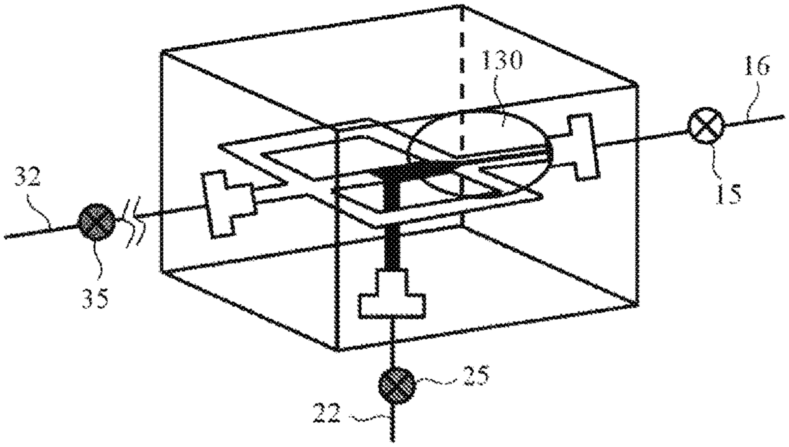

FIG. 24 is a schematic diagram illustrating the flow states of the liquids A and B in the liquid merging portion 604 of this modification example. FIG. 24(*a*) illustrates the initial state. FIG. 24(*b*) illustrates the state immediately after the liquid A is suctioned. FIG. 24(*c*) illustrates a state where the liquid B is in the process of discharge.

FIG. 25 is an enlarged view of the merging portion 130 in the state of FIG. 24(*c*). As illustrated in FIG. 25, a sheath flow opposite to that in FIG. 20 can be formed at the merging portion 130 of the liquid merging portion 604.

Seventh Embodiment

Although the liquid merging portion 1 has one flow path 12 in the description of the first embodiment, the flow path

12 may be configured by a plurality of flow paths. In a seventh embodiment, the liquid merging portion 1 with such a configuration is proposed.

Figure 26A:
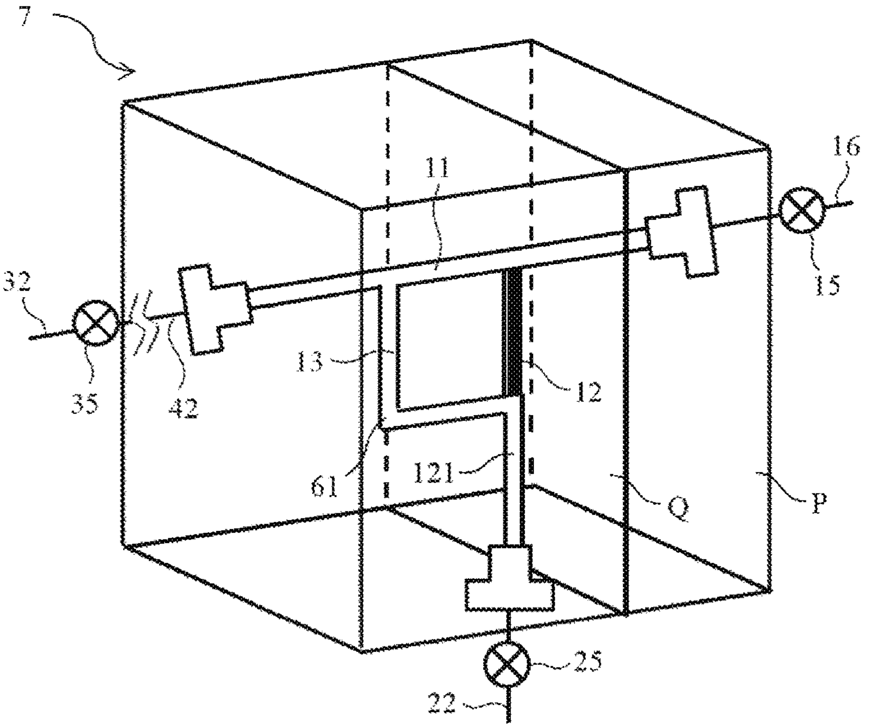
FIG. 26 is a schematic diagram illustrating a liquid merging portion 7 according to a seventh embodiment.
Figure 26B:
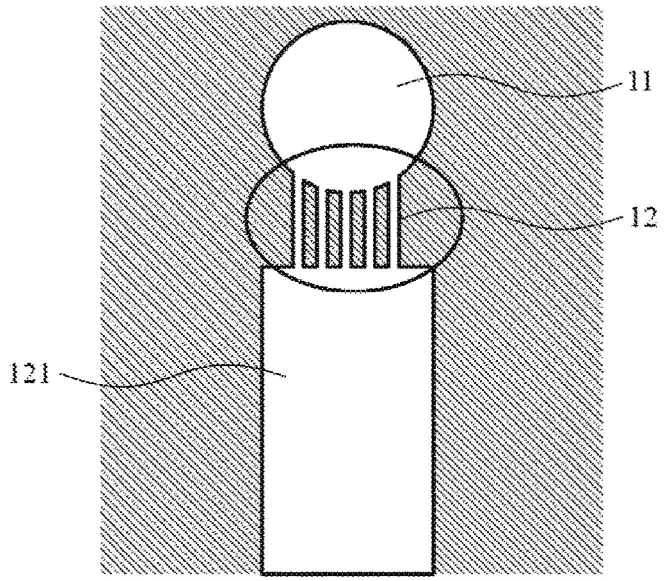

FIG. 26 is a schematic diagram illustrating a liquid merging portion 7 according to the seventh embodiment. FIG. 26(*a*) is a perspective view of the liquid merging portion 7. The liquid merging portion 7 differs from the liquid merging portion 1 illustrated in FIG. 11 in that the flow path 12 is configured by a plurality of small-diameter flow paths. The plurality of flow paths 12 extend parallel to each other.

FIG. 26(*b*) is a cross-sectional view on a surface Q parallel to a surface P in FIG. 26(*a*) and passing through the flow path 12. As illustrated in FIG. 26(*b*), the plurality of flow paths 12 extend from a flow path 121 that is connected to the inflow path 22 and into which the liquid A flows and merge with the flow path 11.

According to this configuration, in the liquid B discharge operation of step S4, the liquid A held in the flow path 12 and the flow path 13 is washed away by the liquid B, flows out to the flow path 11 from the flow path 12, and merges with the liquid B that has flowed from the flow path 11. Since the plurality of small-diameter flow paths 12 are formed, the liquid A and the liquid B merging in the flow path 11 results in a plurality of narrow parallel flows, the area of contact between the liquid A and the liquid B increases, and the distance of diffusion decreases. Therefore, the mixing performance can be considerably improved.

Eighth Embodiment

Proposed in an eighth embodiment is another flow path configuration of a liquid merging portion that enables parallel flow formation.

Figure 27A:
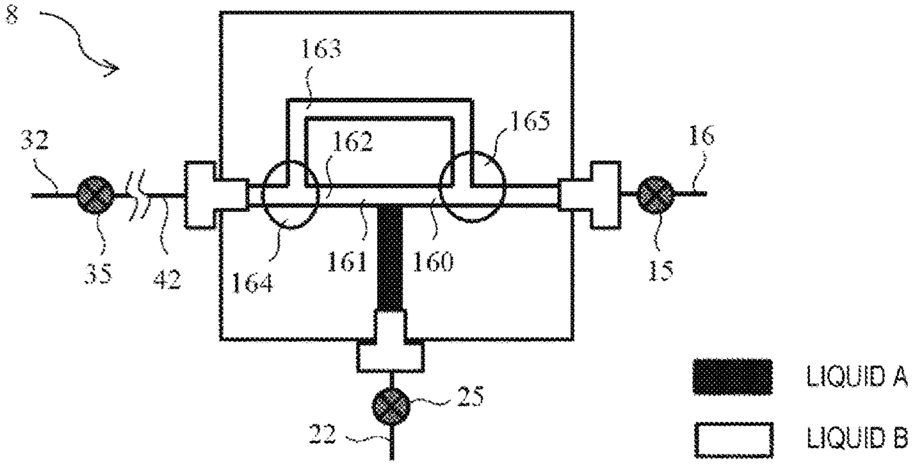
FIG. 27 is a schematic diagram illustrating the flow states of the liquids A and B in a liquid merging portion 8 according to an eighth embodiment.
Figure 27B:
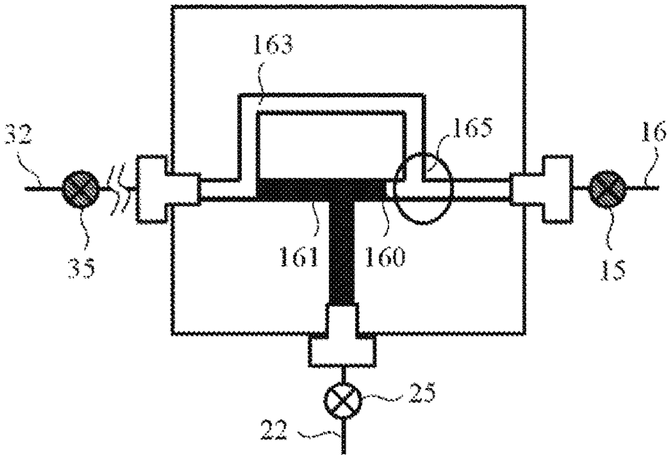
Figure 27C:
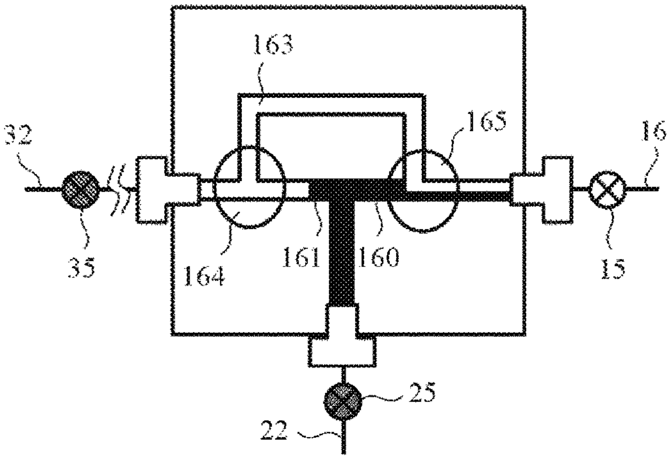

FIGS. 27(*a*) to 27(*c*) are schematic diagrams illustrating the flow states of the liquids A and B in a liquid merging portion 8 according to the eighth embodiment. As illustrated in FIGS. 27(*a*) to 27(*c*), the liquid merging portion 8 has flow paths 160 to 163. The flow path that is connected to the inflow path 22 and into which the liquid A flows branches into the two flow paths 160 and 161. Meanwhile, the flow path that is connected to the inflow path 42 and into which the liquid B flows branches into the two flow paths 162 and 163 at a branching portion 164. The flow path 161 that has branched off the flow path into which the liquid A flows and the flow path 162 that has branched off the flow path into which the liquid B flows are connected to each other to become one flow path (hereinafter, these will be collectively referred to as "flow path 161"). In addition, the flow path 160 that has branched off the flow path into which the liquid A flows and the flow path 163 that has branched off the flow path into which the liquid B flows merge with each other at a merging portion 165 on the downstream side.

FIG. 27(*a*) illustrates the initial state. From this state, the liquid A is suctioned in the operation of step S2, and then the liquid A is held in the flow path 161 as illustrated in FIG. 27(*b*). From this state, the discharge operation of step S4 is performed after step S3, and then the liquid B that has flowed to the flow path 161 as the liquid B that has branched at the branching portion 164 washes away the liquid A held in the flow path 161 as illustrated in FIG. 27(*c*), the liquid B that has flowed from the flow path 163 and the liquid A washed away in the flow path 161 merge at the merging portion 165, and parallel flows of the liquid A and the liquid B are formed. As a result, the area of contact between the liquid A and the liquid B increases, the distance of diffusion decreases, and thus the mixing efficiency is improved.

Modification Example

The present disclosure is not limited to the embodiments described above and includes various modification examples. For example, the above embodiments have been described in detail in order to describe the present disclosure in an easy-to-understand manner, and not every configuration described above is essential. In addition, a part of one embodiment can be replaced with the configuration of another embodiment. In addition, the configuration of one embodiment can be added to the configuration of another embodiment. In addition, a part of the configuration of one embodiment can be added, deleted, or replaced with regard to a part of the configuration of each embodiment.

An electrolyte measuring device as an example can be equipped with the liquid mixers according to the first to eighth embodiments. An internal standard solution diluted to a predetermined concentration is supplied to an ion-selective electrode of the electrolyte measuring device. The liquid mixer of the present disclosure can be used to prepare this diluted internal standard solution. In this case, the liquid A is a concentrated internal standard solution and the liquid B is pure water. By diluting the internal standard solution with the liquid mixer immediately before supply to the ion-selective electrode in this manner, the frequency of maintenance of the electrolyte measuring device can be reduced. In addition, not only electrolyte measuring devices but also any devices for mixing and using two types of liquids can be equipped with the liquid mixer of the present disclosure.

REFERENCE SIGNS LIST

1, 6, 7, 8, 602, 604: liquid merging portion
10: T-shaped merging instrument
15, 25, 35: valve
11 to 14, 18, 19, 86, 87, 101 to 109, 140, 150 to 154, 160 to 163: flow path
16, 84: outflow path
21: liquid A holding container
22, 32, 42, 83: inflow path
31: liquid B holding container
41: liquid sending device
60, 71, 88, 164: branching portion
61: elbow portion
70, 89, 110, 120, 130, 165: merging portion
80: liquid mixing portion
81: liquid mixing portion
85: branching and merging flow path
100, 200, 300, 500, 600, 601, 603: liquid mixer

The invention claimed is:

1. A liquid mixer comprising:

a first inflow path into which a first liquid flows;

a second inflow path into which a second liquid flows;

a liquid merging portion that is connected to the first inflow path and the second inflow path and where the first liquid and the second liquid merge;

an outflow path that is connected to the liquid merging portion and where a merged liquid of the first liquid and the second liquid flows out; and a single liquid sending device installed between the second inflow path and the liquid merging portion, wherein the liquid merging portion has a first flow path connected to the first inflow path and a second flow path connected to the second inflow path,
the first flow path branches into at least two flow paths,
the second flow path branches into at least two flow paths,
one of the flow paths that have branched off the first flow path and one of the flow paths that have branched off the second flow path are connected to each other and merge, and
the other one of the flow paths that have branched off the first flow path and the other one of the flow paths that have branched off the second flow path are connected to each other and merge on a downstream side and connected to the outflow path; and
the liquid mixer further comprising:
a first valve installed on the first inflow path;
a second valve installed on the second inflow path;
a third valve installed on the outflow path; and
a control device controlling driving of the liquid sending device, the first valve, the second valve, and the third valve,
wherein the control device executes
processing of suctioning the first liquid to the liquid merging portion with the liquid sending device by opening the first valve and closing the second valve and the third valve,
processing of suctioning the second liquid to the liquid sending device with the liquid sending device by closing the first valve, opening the second valve, and closing the third valve, and
processing of sending the second liquid from the liquid sending device to the liquid merging portion and discharging the merged liquid of the first liquid and the second liquid from the liquid merging portion by closing the first valve and the second valve and opening the third valve.

2. The liquid mixer according to claim 1, wherein
the first flow path and the second flow path are linear,
a linear third flow path that has branched off the first flow path is connected to the outflow path,
the first flow path is a flow path that has branched off the second flow path, and
the second flow path is connected to and merges with the third flow path.

3. The liquid mixer according to claim 2, wherein a sum of volumes of the first flow path and the third flow path is larger than a volume of the first liquid flowing in in one cycle.

4. The liquid mixer according to claim 2, wherein a length of the third flow path is shorter than a length of the first flow path or a hydraulic diameter of the third flow path is larger than a hydraulic diameter of the first flow path.

5. The liquid mixer according to claim 4, wherein a length of the second flow path is shorter than the length of the first flow path or a hydraulic diameter of the second flow path is larger than the hydraulic diameter of the first flow path.

6. The liquid mixer according to claim 1, further comprising a liquid mixing portion installed on a downstream side of the outflow path.

7. The liquid mixer according to claim 6, wherein the liquid mixing portion is a linear or coil-shaped flow path or has a cavity portion with a shape of a cone, a column, a polygon, a sphere, a hemisphere, or a combination thereof.

8. The liquid mixer according to claim 1, further comprising a branching and merging flow path installed on a downstream side of the outflow path,
wherein the branching and merging flow path has a fourth flow path and a fifth flow path that have branched off one flow path connected to the outflow path, the fourth flow path and the fifth flow path remerge on a downstream side, and the fourth flow path and the fifth flow path differ from each other in hydraulic diameter or the fourth flow path and the fifth flow path differ from each other in length.

9. The liquid mixer according to claim 2, wherein a ratio of resistance of the second flow path and resistance of the first and third flow paths is equal to or greater than a mixing ratio of the first liquid and the second liquid.

10. An electrolyte analysis device comprising the liquid mixer according to claim 1.

11. A liquid mixing method executed by a control device of a liquid mixer,
the liquid mixer comprising:
a first inflow path into which a first liquid flows;
a second inflow path into which a second liquid flows;
a liquid merging portion that is connected to the first inflow path and the second inflow path and where the first liquid and the second liquid merge;
an outflow path that is connected to the liquid merging portion and where a merged liquid of the first liquid and the second liquid flows out; and
a single liquid sending device installed between the second inflow path and the liquid merging portion, wherein
the liquid merging portion has a first flow path connected to the first inflow path and a second flow path connected to the second inflow path,
the first flow path branches into at least two flow paths,
the second flow path branches into at least two flow paths,
one of the flow paths that have branched off the first flow path and one of the flow paths that have branched off the second flow path are connected to each other and merge, and
the other one of the flow paths that have branched off the first flow path and the other one of the flow paths that have branched off the second flow path are connected to each other and merge on a downstream side and connected to the outflow path;
the method comprising:
suctioning the first liquid to the liquid merging portion with the liquid sending device by the control device opening a first valve installed on the first inflow path and closing a second valve installed on the second inflow path and a third valve installed on the outflow path;
suctioning the second liquid to the liquid sending device with the liquid sending device by the control device closing the first valve, opening the second valve, and closing the third valve; and
sending the second liquid from the liquid sending device to the liquid merging portion and discharging the merged liquid of the first liquid and the second liquid from the liquid merging portion by the control device closing the first valve and the second valve and opening the third valve.

12. The liquid mixer according to claim 11, wherein
the first flow path and the second flow path are linear,
a linear third flow path that has branched off the first flow path is connected to the outflow path,
the first flow path is a flow path that has branched off the second flow path, and the second flow path is connected to and merges with the third flow path.

13. The liquid mixer according to claim 12, wherein a ratio of resistance of the second flow path and resistance of the first and third flow paths is equal to or greater than a mixing ratio of the first liquid and the second liquid.

14. The liquid mixer according to claim 12, wherein a sum of volumes of the first flow path and the third flow path is larger than a volume of the first liquid flowing in in one cycle.

15. The liquid mixer according to claim 12, wherein a length of the third flow path is shorter than a length of the first flow path or a hydraulic diameter of the third flow path is larger than a hydraulic diameter of the first flow path.

16. The liquid mixer according to claim 15, wherein a length of the second flow path is shorter than the length of the first flow path or a hydraulic diameter of the second flow path is larger than the hydraulic diameter of the first flow path.

17. The liquid mixer according to claim 11, further comprising a liquid mixing portion installed on a downstream side of the outflow path.

18. The liquid mixer according to claim 17, wherein the liquid mixing portion is a linear or coil-shaped flow path or has a cavity portion with a shape of a cone, a column, a polygon, a sphere, a hemisphere, or a combination thereof.

19. The liquid mixer according to claim 11, further comprising a branching and merging flow path installed on a downstream side of the outflow path, wherein the branching and merging flow path has a fourth flow path and a fifth flow path that have branched off one flow path connected to the outflow path, the fourth flow path and the fifth flow path remerge on a downstream side, and the fourth flow path and the fifth flow path differ from each other in hydraulic diameter or the fourth flow path and the fifth flow path differ from each other in length.

20. An electrolyte analysis device comprising the liquid mixer according to claim 11.

* * * * *